(12) United States Patent
Imai

(10) Patent No.: US 8,014,051 B2
(45) Date of Patent: Sep. 6, 2011

(54) OPTICAL SCANNING DEVICE AND IMAGE FORMING APPARATUS

(75) Inventor: Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 12/396,813

(22) Filed: Mar. 3, 2009

(65) Prior Publication Data

US 2009/0225385 A1    Sep. 10, 2009

(30) Foreign Application Priority Data

Mar. 4, 2008    (JP) .................................. 2008-053948

(51) Int. Cl.
  *G02B 26/08*    (2006.01)
(52) U.S. Cl. ................ 359/212.1; 359/204.5; 359/205.1; 347/232
(58) Field of Classification Search .... 359/196.1–226.2, 359/558, 565–576
  See application file for complete search history.

(56) References Cited

U.S. PATENT DOCUMENTS

| | | | |
|---|---|---|---|
| 6,384,949 B1 | 5/2002 | Suzuki | |
| 6,813,051 B2 | 11/2004 | Suzuki et al. | |
| 7,277,212 B2 | 10/2007 | Miyatake et al. | |
| 7,355,770 B2 | 4/2008 | Miyatake et al. | |
| 7,362,486 B2 | 4/2008 | Hayashi et al. | |
| 7,663,657 B2 * | 2/2010 | Ichii et al. ..................... | 347/244 |
| 2004/0240000 A1 | 12/2004 | Miyatake et al. | |
| 2005/0179771 A1 | 8/2005 | Ueda | |
| 2005/0190420 A1 | 9/2005 | Imai et al. | |
| 2006/0158711 A1 | 7/2006 | Imai et al. | |
| 2007/0058255 A1 | 3/2007 | Imai et al. | |
| 2007/0211324 A1* | 9/2007 | Sakai et al. ................... | 359/213 |
| 2007/0236557 A1 | 10/2007 | Imai et al. | |
| 2008/0019255 A1 | 1/2008 | Imai et al. | |
| 2008/0068678 A1 | 3/2008 | Suzuki et al. | |
| 2008/0170283 A1 | 7/2008 | Imai | |
| 2008/0192323 A1 | 8/2008 | Nakamura et al. | |
| 2008/0259426 A1 | 10/2008 | Imai | |
| 2009/0251753 A1* | 10/2009 | Hirakawa et al. .......... | 359/204.5 |

FOREIGN PATENT DOCUMENTS

| | | |
|---|---|---|
| JP | 4-171415 | 6/1992 |
| JP | 9-64444 | 3/1997 |
| JP | 10-227992 | 8/1998 |

(Continued)

OTHER PUBLICATIONS

U.S. Appl. No. 12/394,732, filed Feb. 27, 2009, Imai.

(Continued)

*Primary Examiner* — James Phan
(74) *Attorney, Agent, or Firm* — Oblon, Spivak, McClelland, Maier & Neustadt, L.L.P.

(57) ABSTRACT

At least one of a coupling lens and a cylindrical lens has a diffraction lens surface having a ring-band structure with a height h between adjacent ring-bands. The diffraction lens surface has an area A having a shape similar to that of the ring-band structure with a height h', where h≠h'. The ring-band structure has a function of correcting a fluctuation in focal position of the scanning beam on the scanning surface, and the area A has a function of expanding a focal depth of a light spot on the scanning surface.

16 Claims, 19 Drawing Sheets

FOREIGN PATENT DOCUMENTS

| | | |
|---|---|---|
| JP | 2002-287062 | 10/2002 |
| JP | 3507244 | 12/2003 |
| JP | 3576817 | 7/2004 |
| JP | 2005-258392 | 9/2005 |
| JP | 2006-235069 | 9/2006 |
| JP | 3920487 | 2/2007 |

OTHER PUBLICATIONS

U.S. Appl. No. 12/174,899, filed Jul. 17, 2008, Kenichiroh Saisho, et al.

U.S. Appl. No. 12/207,739, filed Sep. 10, 2008, Shigeaki Imai.

U.S. Appl. No. 12/208,479, filed Sep. 11, 2008, Shigeaki Imai.

* cited by examiner

FIG. 3
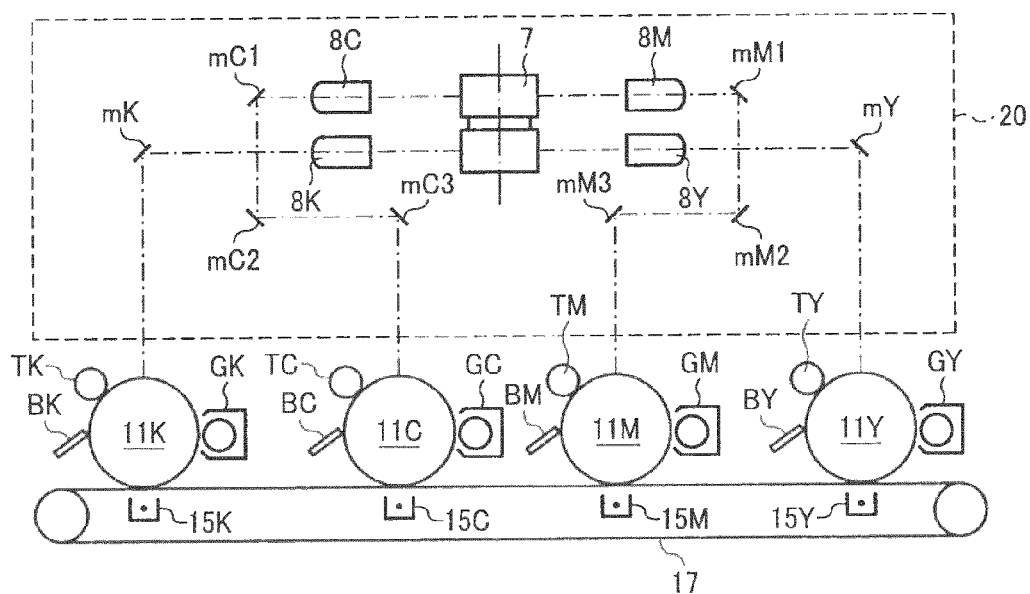
FIG. 4A
SUB-SCANNING
DIRECTION
MAIN-SCANNING
DIRECTION
FIG. 4B
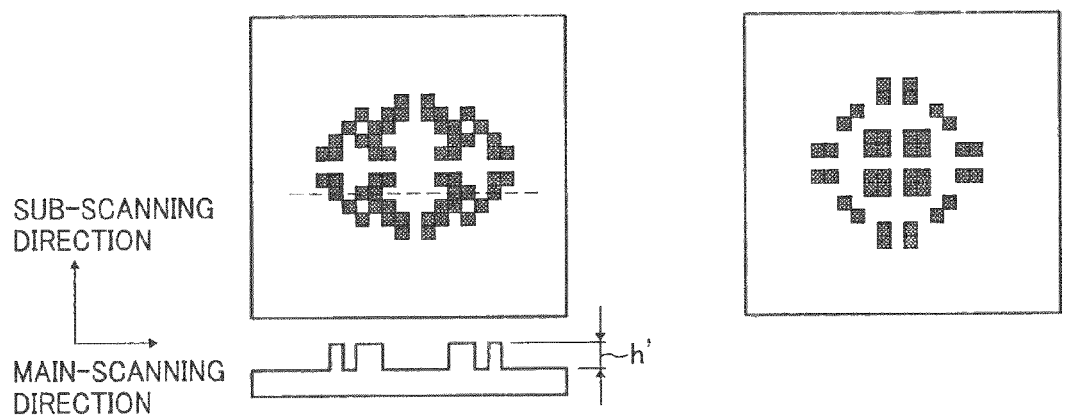
FIG. 4C
FIG. 4D
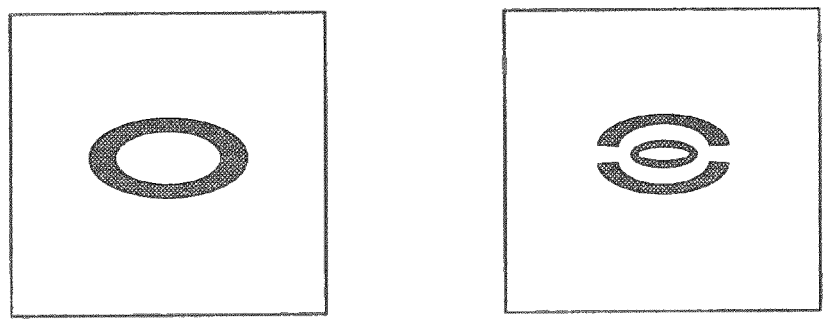

210, 390, 690, 750, 930 μm IN ORDER
FROM SMALLEST DIAMETER

FIG. 13

|  | SIDE-LOBE PEAK INTENSITY [%] | DEPTH ALLOWANCE [mm] | BEAM SPOT SIZE [$\mu$m] |
| --- | --- | --- | --- |
| WITHOUT DEPTH EXPANDING ELEMENT | 1.6 | 8.9 | 56.4 |
| DEPTH EXPANDING ELEMENT 1 | 10.4 | 18.0 | 48.1 |
| DEPTH EXPANDING ELEMENT 2 | 9.6 | 15.0 | 47.7 |
| DEPTH EXPANDING ELEMENT 3 | 8.1 | 13.8 | 50.7 |
| DEPTH EXPANDING ELEMENT 4 | 5.8 | 12.9 | 51.8 |
| DEPTH EXPANDING ELEMENT 5 | 3.8 | 11.2 | 53.3 |
| CONVENTIONAL DEPTH EXPANDING ELEMENT | 0.6 | 6.4 | 58.4 |

|OPTICAL AXIS

CONCENTRIC DIFFRACTION
LENS SURFACE

ELLIPTICAL DIFFRACTION
LENS SURFACE

LINEAR DIFFRACTION
LENS SURFACE

DIAMETER OF ZEROTH RING-BAND
(MAIN-SCANNING DIRECTION × SUB-SCANNING DIRECTION):
1.480 mm × 0.420 mm

DEPTH EXPANDING ELEMENT
(RING STRUCTURE CIRCUMSCRIBED IN ZEROTH RING-BAND)

(INNER DIAMETER: MAIN-SCANNING DIRECTION ×
SUB-SCANNING DIRECTION) 0.700 × 0.200
(OUTER DIAMETER: MAIN-SCANNING DIRECTION ×
SUB-SCANNING DIRECTION) 1.480 × 0.420

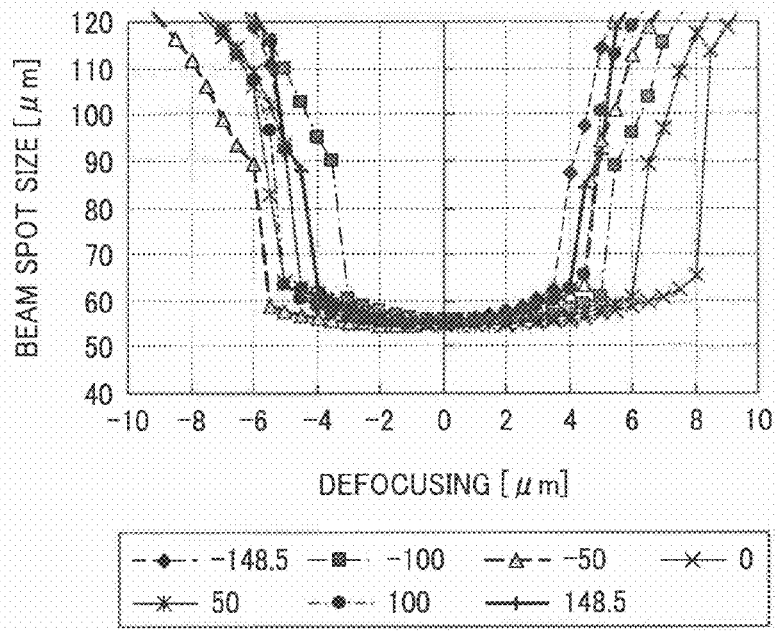
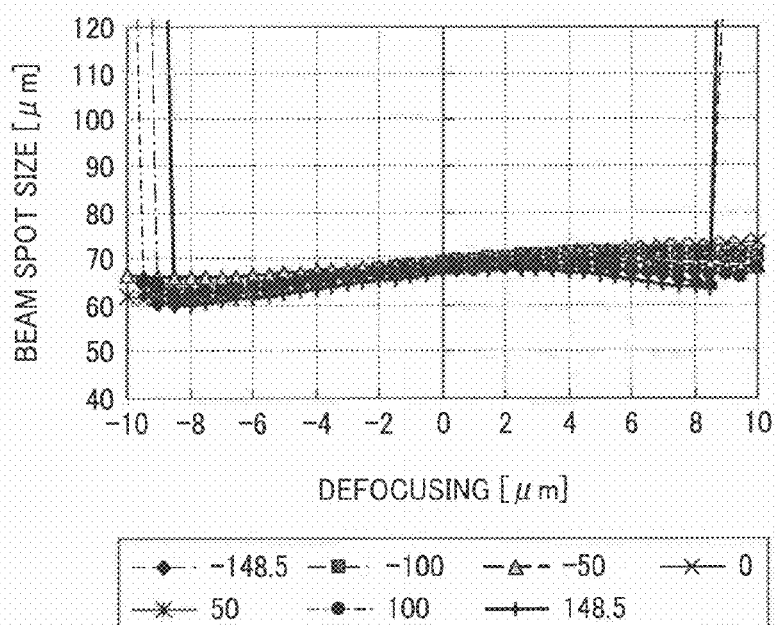

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-053948 filed in Japan on Mar. 4, 2008.

BACKGROUND OF THE INVENTION

1. Field of the Invention

The present invention relates to a technology for reducing and stabilizing a beam spot size on a scanning surface in an optical scanning device.

2. Description of the Related Art

Recently, improvement in image quality of images output by "image forming apparatuses, such as multifunction peripherals (MFPs)" through optical scanning is being more and more demanded. To meet such a demand, a beam spot size at the time of optical scanning needs to be reduced and stabilized. "The stabilization of the beam spot size" can be attained by expanding a depth allowance of a light beam (a defocusing distance in an optical axis direction, which is determined such that a beam spot size is maintained within an allowable range). Regarding the depth allowance, it is widely known that the following relationship is satisfied.

$$d \propto w^2/\lambda$$

where d is depth allowance, w is beam spot size, and $\lambda$ is operation wavelength for optical scanning. In other words, if the depth allowance increases, the beam spot size increases in proportion to the depth allowance. Therefore, it has been difficult to attain both reduction and stabilization of the beam spot size at the same time.

One approach to "expand a depth allowance" and maintain a small beam spot size at the same time may be to use a Bessel beam.

A "Bessel beam" is disclosed in, for example, Japanese Patent No. 3507244. Specifically, it is disclosed that the Bessel beam has a side lobe with an extremely high light intensity and a high-order side lobe with a relatively high light intensity. Due to such characteristics, if the Bessel beam is used for optical scanning, light use efficiency is lowered, which makes it difficult to increase a processing speed of an image forming operation to the recently-required level.

Environmental fluctuation also affects an image forming operation performed through optical scanning. If environmental conditions such as a temperature or humidity change in an optical scanning device, a wavelength of a laser light source varies or optical characteristic changes due to thermal deformation of a lens. As a result, a focal position of a scanning light beam on a focusing surface fluctuates. Conventional technologies for reducing a shift of a focal position on a focusing surface by using a diffraction lens are disclosed in, for example, Japanese Patent Application Laid-open No. 2005-258392 and Japanese Patent Application Laid-open No. 2006-235069.

SUMMARY OF THE INVENTION

It is an object of the present invention to at least partially solve the problems in the conventional technology.

An optical scanning device according to one aspect of the present invention includes a laser light source that emits a light beam; a coupling lens that collimates the light beam; an aperture that shapes the light beam; a cylindrical lens that focuses the light beam into a linear image; a deflecting unit that has a deflecting reflection surface and deflects the light beam focused near the deflecting reflection surface by the cylindrical lens; and a scanning lens that focuses the light beam deflected by the deflecting unit into a scanning beam on a scanning surface. At least one of the coupling lens and the cylindrical lens has a diffraction lens surface having a ring-band structure with a height h between adjacent ring-bands. The diffraction lens surface has an area A having a shape similar to that of the ring-band structure with a height h', where h' is different from h. The ring-band structure has a function of correcting a fluctuation in focal position of the scanning beam on the scanning surface, and the area A has a function of expanding a focal depth of a light spot on the scanning surface.

To attain "the function for correcting fluctuation in focal position of a light beam on a scanning surface caused by environmental fluctuation" by the ring-band structure, the height difference h between adjacent ring-bands of the ring-band structure is set so that "a phase difference is substantially $2\pi$ or integer times as large as $2\pi$ with respect to an operation wavelength $\lambda$ in the optical scanning device, that is, with respect to a design emission wavelength of the laser light source".

The ring-band structure of the optical scanning device can be formed into any one of the concentric shape, the concentric elliptical shape (the elliptical ring shape formed of elliptical rings each having the similar shape and being arrayed such that the center and the longitudinal direction coincide with those of the rest of the rings), and the linear shape. Thus, the ring-band structure can be formed into the linear shape in which lines are arrayed in a predetermined pattern so that "a diffraction function in one direction" is obtained, as well as the shape in which ring-bands or elliptical ring-bands are concentrically arrayed.

Besides, if the ring-band structure is formed into "the shape in which ring-bands or elliptical ring-bands are concentrically arrayed", "a circular or an elliptical portion" can be contained at the center of the ring-band structure. At this time, each of the circular and the elliptical portions is treated as "the ring-band".

"The area A is formed into the shape similar to the ring-band structure". This means that the contour of the area A has the shape similar to the contour of the ring-band structure. That is, the area A can be formed into the circular shape, the elliptical shape, "the concentric ring shape, the concentric elliptical ring shape, and the linear shape" depending on the contour of the ring-band structure.

"The height difference between adjacent ring-bands is set to h" in the ring-band structure. This means that boundary portions between adjacent ring-bands (the ring-bands formed into any one of the circular shape, the elliptical shape, the concentric circular ring shape, the concentric elliptical ring shape, and the linear shape) are shaped to form "a discontinuous plane with the height difference h kept between adjacent ring-bands in the optical axis direction". Because both the ring-band structure and the area A are formed on a lens surface, if the lens surface is curved, the shapes of the ring-band structure and the area A are affected by the curved shape of the lens surface.

The area A also has "the ring-band" because the area A is formed into the shape "similar to the ring-band structure".

The area A is arranged on inner side of a fifth ring-band of the ring-band structure.

The ring-band structure is formed into a multi-stepped shape in which a height of each ring-band is monotonically increasing or decreasing from inner side towards outer side. In this case, the ring-band structure is formed such that the height of each ring-band is set higher or lower than that of an adjacent ring-band by the height difference h in a stepwise manner from the inner side towards the outer side. Alternatively, it is possible to form the ring-band structure as "a Fresnel lens surface". In this case, "lens surfaces with fine widths" constituting ring-bands are shaped to form a discontinuous plane with "the height difference h" kept between adjacent lens surfaces.

When the area A is formed on the diffraction lens surface having the ring-band structure of the multi-stepped shape, it is preferable to form all the ring-bands including the ring-bands of the ring-band structure and the area A such that the height of each ring-band is set to be uniformly higher or lower than that of an adjacent ring-band in a stepwise manner from the inner side towards the outer side so as to simplify a formation process of the area A.

The area A is formed in either one of an elliptical shape and an elliptical ring shape arranged on inner side of zeroth ring-band of the ring-band structure such that the elliptical shape is arranged at a center of the ring-band structure or the elliptical ring shape is inscribed in the zeroth ring-band.

The area A is formed into a shape same as at least one of n-th ring-bands of the ring-band structure, where n is an integer equal to or larger than zero.

The area A is arranged within n-th ring-band of the ring-band structure, where n is an integer equal to or larger than zero, such that at least one of inner circumference and outer circumference of the area A coincides with a contour of the ring-band structure or the area A overlaps with both the n-th ring-band and at least one of adjacent ring-bands.

It is preferable to set the height h' of the area A to be substantially half of the height difference h between adjacent ring-bands of the ring-band structure in the optical scanning device.

The scanning lens is a magnifying optical system in which a lateral magnification in the sub-scanning direction is set to be equal to or larger than −2 optical power and equal to or smaller than −5 optical power, and the scanning lens is formed with a single lens.

The aperture is arranged near a lens that has the diffraction lens surface having the ring-band structure and the area A, or integrated with the lens, and the aperture includes a shielding portion having a transmittance equal to or less than 0.1%.

An image forming apparatus according to another aspect of the present invention forms an electrostatic latent image on a photosensitive element. The image forming apparatus includes an optical scanning device according to the present invention, which scans a surface of the photosensitive element with a light beam.

The photosensitive element includes a plurality of photosensitive elements on which electrostatic latent images of different colors are formed and developed into toner images with toners of corresponding colors, respectively, and the toner images are superimposed on a recording medium to form a full-color image.

Both the "single-beam system" and the "multibeam system" can be employed for optical scanning on the scanning surface in the optical scanning device.

Explanation is given below about "the function for correcting fluctuation in focal position of a light beam on a scanning surface caused by environmental fluctuation", which is attained by the ring-band structure.

It is assumed that, for making the explanation be concrete, the ring-band structure is formed as a diffraction lens surface on "one lens surface of a coupling lens", where the coupling lens has an optical function for "converting a light beam emitted from a laser light source into a parallel beam". The height difference h between adjacent ring-bands of the ring-band structure is set so that "a phase difference is substantially $2\pi$ or integer times as large as $2\pi$ with respect to an operation wavelength $\lambda$".

When a light beam from the laser light source passes through the diffraction lens surface having the ring-band structure, the light beam is divided into a plurality of light beams by the ring-bands. However, because the phase difference between adjacent ring-bands is uniformly set to be "substantially $2\pi$ or integer times as large as $2\pi$ with respect to an operation wavelength", all the divided light beams are given with phases that "match with each other". Therefore, by passing through the coupling lens, the light beam is turned into a plane wave that is a parallel light beam.

The emission wavelength of "the semiconductor laser and a surface-emitting laser" that are typically used as a laser light source is generally "shifted towards a long wavelength band" due to increase in temperature. The scanning lens used in the optical scanning device is generally configured to have a positive refractive power to focus a deflected light beam onto the scanning surface. Generally, thermal deformation or fluctuation in refractive index of a lens weakens positive power of a positive lens and negative power of a negative lens.

Assuming that the scanning lens is a positive lens, if its positive power is weakened and the emission wavelength shifts towards a long wavelength band due to increase in temperature, the phases of the light beams divided by the ring-bands of the ring-band structure do not match with each other. At this time, if the shape of the ring-band structure is adjusted, the light beam with the elongated wavelength can be turned into "a focusing light beam" by passing through the coupling lens.

If "the focusing light beam" is incident on "the scanning lens with weak positive power", reduction of the positive power of the scanning lens can be suppressed due to "convergence of a light beam". Besides, by adjusting the shape of the ring-band structure of the diffraction lens and causing the light beam to pass through the coupling lens, the light beam can be turned into a focusing lens. Therefore, "the reduction of the positive power of the scanning lens" can be balanced out. Likewise, if a lens to be subjected to the environmental fluctuation is formed as a negative lens, "reduction of negative power of the scanning lens" can be balanced out by adjusting the shape of the ring-band structure.

In this manner, the diffraction lens surface with the ring-band structure can have "the function for correcting fluctuation in focal position of a light beam on a scanning surface caused by environmental fluctuation". In the above example, correction of fluctuation in power of the scanning lens is described. However, fluctuation in focal position on a focusing surface due to fluctuation in power of any lenses arranged on an optical path from the laser light source to the scanning surface can be corrected by using the ring-band structure.

Meanwhile, the area A can have "the function for expanding a depth allowance of a beam spot (depth expanding function)" by setting the area A to have "the height h' different from the height difference h between adjacent ring-bands".

The ring-band structure and the area A cause an incident light beam to have a two-dimensional phase distribution. Such a phase distribution can be obtained by "forming the lens surface, on which the ring-band structure and the area A are formed, to have a refractive-index distribution or a height distribution". Generally, the phase distribution is obtained by "the height distribution" because of easiness in forming of the ring-band structure and the area A. Hereinafter, each of the refractive-index distribution and the height distribution given with the ring-band structure and the area A so that the light beam is to have a desired phase distribution is referred to as "a phase distribution".

The inventors of the present invention found the following method as "a method of expanding a depth allowance without increasing a beam spot size".

That is, the peak intensity of a side lobe (the side lobe adjacent to a main lobe) in a beam profile of a beam spot on a focusing surface, that is, on a scanning surface, of the scanning lens is "raised not to exceed the level that affects the optical scanning". According to the present invention, the phase distribution of each of the area A and surrounding areas of the area A is determined so that "the peak intensity of the side lobe is raised not to exceed the level that affects the optical scanning".

Specifically, the phase distribution of the area A is determined so that the following Inequality is satisfied.

$$PS/PM > PS1/PM1 \quad (1)$$

where PS is peak intensity of a side lobe and PM is peak intensity of a main lobe in a light-intensity profile (a beam profile) of a beam spot on a focusing surface (a scanning surface in design) of a scanning lens when the phase adjustment is performed by using the area A, and PS1 is peak intensity of a side lobe and PM1 is peak intensity of a main lobe in a light-intensity profile of a beam spot on the focusing surface when the phase adjustment is not performed by using the area A. Hereinafter, the above-mentioned setting of the phase distribution is referred to as "a phase adjustment".

Furthermore, it is preferable to set the phase distribution of the area A so that the following Inequality is satisfied.

$$PS2/PM2 < PSA/PMA \quad (2)$$

where PS2 is peak intensity of a side lobe and PM2 is peak intensity of a main lobe in a light-intensity profile of a beam spot "at a position on the optical axis other than the focusing surface" of the scanning lens when the phase adjustment is performed by using the area A, and PSA is peak intensity of a side lobe and PMA is peak intensity PMA of a main lobe in a light-intensity profile of a beam spot at the same position when the phase adjustment is not performed by using the area A.

Moreover, it is preferable to set the phase distribution of the area A so that the following Inequality is satisfied.

$$PM4/PM3 > PM6/PM5 \quad (3)$$

where PM4 is peak intensity of a main lobe in "a light-intensity profile of a beam spot at the position other than the focusing surface" and PM3 is peak intensity of a main lobe in "a light-intensity profile of a beam spot on the focusing surface" when the phase adjustment is performed based on Inequalities (1) and (2), and PM6 is peak intensity of a main lobe in "a light-intensity profile of a beam spot at the position other than the focusing surface" and PM5 is peak intensity of a main lobe in "a light-intensity profile of a beam spot on the focusing surface" when the phase adjustment is not performed based on Inequalities (1) and (2).

Generally, the peak intensity of the light-intensity profile of the beam spot at "a position distant from the focusing surface" is smaller than the peak intensity of the beam spot on the focusing surface. If Inequality (3) is satisfied, which means that the reduction level of the peak intensity at the position distant from the focusing surface is suppressed, it is possible to suppress the reduction amount of light energy used for exposing a photosensitive element in an image forming apparatus even when "a position of the scanning surface changes due to change in setting position of the photosensitive element" over time. Therefore, "fluctuation in size of writing dot" caused by fluctuation in exposure light energy can be suppressed, resulting in improving image quality of output images.

Inequality (1) is a necessary condition that must be satisfied for expanding a depth, that is, for "expanding a depth allowance". Therefore, the phase distribution of the area A is set so that Inequality (1) is satisfied.

The greater an increase in peak intensity of the side lobe is, the greater the "expansion of the depth allowance" is. However, if the peak intensity of the side lobe is raised too high, "toner scattering" occurs around dots constituting an image to be formed or "background fog" of an image occurs. Besides, if the peak intensity of the main lobe is reduced too low, a processing speed of optical scanning may be delayed.

Therefore, it is preferable to set the peak intensity of the side lobe to be "13.5% or less, more preferably, 10% or less of the peak intensity of the main lobe".

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an image forming apparatus according to the embodiment;

FIGS. 4A to 4D are examples of phase patterns on an area A that is used for expanding a depth allowance according to the embodiment;

FIG. 13 is a table containing side-lobe peak intensity, depth allowance, and beam spot size according to the embodiment;

FIGS. 27A and 27B are graphs of a depth allowance when a depth is expanded.

DETAILED DESCRIPTION OF THE PREFERRED EMBODIMENTS

Exemplary embodiments of the present invention are explained in detail below with reference to the accompanying drawings.

Figure 1:
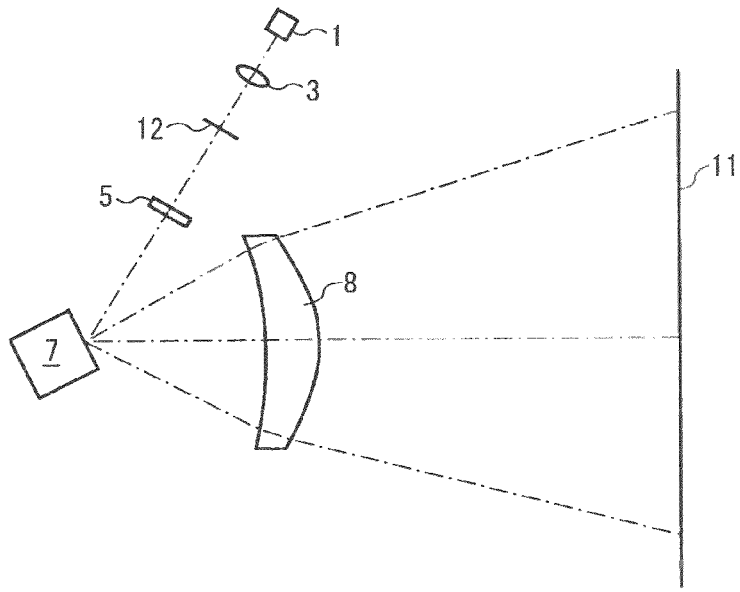
FIG. 1 is a schematic diagram of optical arrangement of an optical scanning device according to an embodiment of the present invention.

FIG. 1 is a schematic diagram of optical arrangement of an optical scanning device according to an embodiment of the present invention. In FIG. 1, an optical system that forms an optical path from a laser light source 1 to a scanning surface 11 is arranged in a plane. A light beam emitted from the laser light source 1 is converted into a parallel beam by a coupling lens 3, and falls on a cylindrical lens 5 through an aperture 12. The light beam is converged by the cylindrical lens 5 in a sub-scanning direction (a direction perpendicular to the plane of FIG. 1), and focused into a linear image elongated in a main-scanning direction near a deflecting reflection surface of a polygon mirror 7, which serves as a deflecting unit. It is assumed, in the embodiment, that the polygon mirror 7 has four deflecting reflection surfaces.

The light beam deflected by the deflecting reflection surface of the polygon mirror 7 passes through a scanning lens 8 and is focused into a beam spot on the scanning surface 11. The scanning lens 8 can be made of glass or resin.

When the polygon mirror 7 rotates at a constant speed, the light beam reflected by the deflecting reflection surface deflects at a constant angular velocity, whereby the scanning surface 11 is scanned with the beam spot.

The aperture 12 shields a peripheral light-beam region of the light beam to shape the light beam.

The scanning lens 8 has a function same as that of an fθ lens. That is, the scanning lens 8 converts a constant angular-velocity scanning of the light beam deflected by the polygon mirror 7 into a constant velocity scanning with the beam spot on the scanning surface 11.

Due to the scanning lens 8, the position of the deflecting reflection surface of the polygon mirror 7 and the position of the scanning surface 11 are in "a conjugate relation with respect to the sub-scanning direction". In the sub-scanning direction, "the linear image elongated in the main-scanning direction" is an object point of the scanning lens 8, so that "optical face tangle error" of the polygon mirror 7 is corrected. In the embodiment, it is assumed that the scanning lens 8 is made of resin. The polygon mirror 7 is housed in an insulating casing (not shown) having a window covered by a parallel plate glass, through which a light beam emitted from the laser light source 1 enters into the polygon mirror 7 and a deflected light beam is output from the polygon mirror 7 towards the scanning lens 8.

The scanning surface 11 in FIG. 1 is, in concrete terms, "the photosensitive surface of a photosensitive element". The optical arrangement of the optical scanning device shown in FIG. 1 is a widely known configuration. By combining the optical scanning devices having the configuration of FIG. 1 in an arrangement shown in FIG. 2, a tandem optical scanning device can be obtained.

Figure 2:
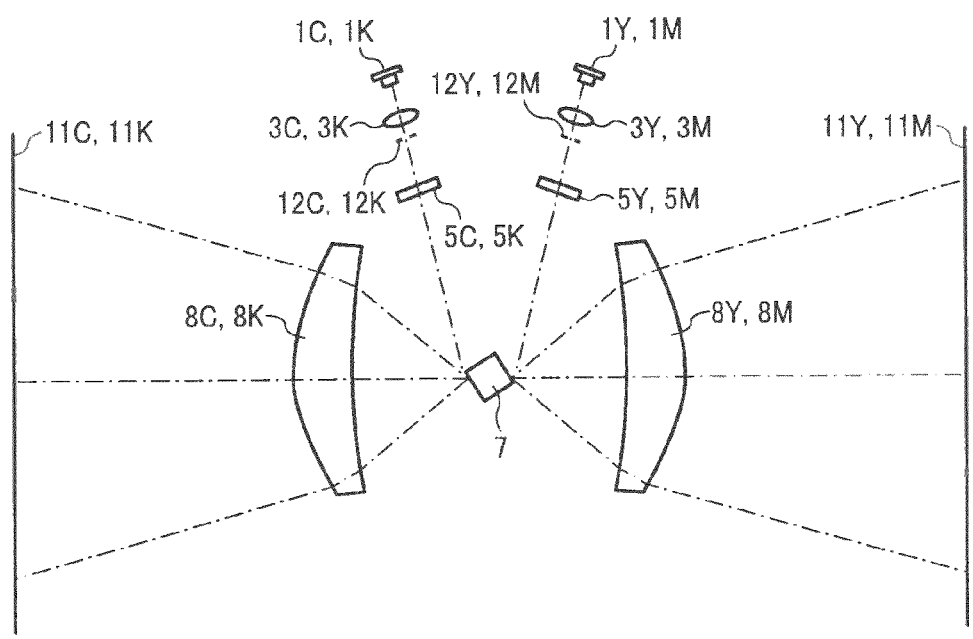
FIG. 2 is a schematic diagram of an optical system of a tandem optical scanning device according to the embodiment.

FIG. 2 is a schematic diagram of an optical system of the tandem optical scanning device viewed in the sub-scanning direction, i.e., the direction in which a rotating shaft of the polygon mirror 7 serving as the deflecting unit extends. For simplifying the figure, optical-path bending mirrors on optical paths leading from the polygon mirror 7 to scanning surfaces 11Y, 11M, 11C, and 11K, which are optical scanning positions, are not shown and the optical paths are depicted as if they were on a plane.

The optical scanning device according to the embodiment scans each of the scanning surfaces 11Y, 11M, 11C, and 11K with a plurality of light beams. The scanning surfaces 11Y, 11M, 11C, and 11K are, in concrete terms, "the photosensitive surfaces of photoconductive photosensitive drums". Electrostatic latent images formed on the four photosensitive drums are developed separately with magenta toner, yellow toner, cyan toner, and black toner, and resultant toner images of four colors are superimposed one on top of the other, whereby a full-color image is formed. In the following description, the scanning surfaces and the photosensitive drums that are the substances of the scanning surfaces will be denoted by the same reference numerals (11Y, 11M, 21C, and 11K).

In FIG. 2, reference numerals 1Y, 1M, 1C, and 1K denote "laser light sources". The laser light sources 1Y and 1M are arranged to overlap each other in the sub-scanning direction perpendicular to the plane of FIG. 2. Each light-emitting source of the laser light source 1M is modulated in light intensity by "an image signal corresponding to a magenta image", and each light-emitting source of the laser light source 1Y is modulated in light intensity by "an image signal corresponding to a yellow image".

Likewise, the laser light sources 1C and 1K are arranged to overlap each other in the sub-scanning direction. Each light-emitting source of the laser light source 1C is modulated in light intensity by "an image signal corresponding to a cyan image", and each light-emitting source of the laser light source 1K is modulated in light intensity by "an image signal corresponding to a black image".

Light beams emitted from the laser light sources 1Y and 1M are converted into parallel beams through coupling lenses 3Y and 3M, pass through apertures 12Y and 12M, and then fall on cylindrical lenses 5Y and 5M aligned (to overlap each other) in the sub-scanning direction, respectively, where light beams are focused in the sub-scanning direction to be incident on the polygon mirror 7.

The coupling lenses 3Y and 3M are arranged to overlap each other in the sub-scanning direction and receive incident light beams from the laser light sources 1Y and 1M. The apertures 12Y and 12M are arranged to overlap each other in the sub-scanning direction and carry out shielding of the peripheral light-beam region of each light beam (beam shaping).

The cylindrical lenses 5Y and 5M focus the light beams into a plurality of "linear images elongated in the main-scanning direction" near deflecting reflection surface of the polygon mirror 7, from which the plurality of deflected light beams travel to pass scanning lenses 8Y and 8M, which act on the light beams to form beam spots on the scanning surfaces 11Y and 11M. Thus, the scanning surfaces 11Y and 11M are scanned with the beam spots.

Likewise, light beams emitted from the laser light sources 1C and 1K are converted into parallel beams through coupling lenses 3C and 3K, passes through apertures 12C and 12K, and then fall on cylindrical lenses 5C and 5K aligned in the sub-scanning direction, where the light beams are focused in the sub-scanning direction to be incident on the polygon mirror 7. Having been deflected by the polygon mirror 7, the light beams travel to pass scanning lenses 8C and 8K, which act on the light beams to form beam spots on the scanning surfaces 11C and 11K. Thus, the scanning surfaces 11C and 11K are scanned with the beam spots.

FIG. 3 is a schematic diagram of an image forming apparatus using the optical scanning device shown in FIG. 2. The portion denoted by reference numeral 20 in FIG. 3 corresponds to "the optical scanning device" described with reference to FIG. 2.

The polygon mirror 7 has four deflecting reflection surfaces, and is of a two-tier structure as shown in FIG. 3. One of light beams deflected at the upper tier of the polygon mirror 7 is guided through an optical path bent by optical-path bending mirrors mM1, mM2, and mM3 to the photosensitive drum 11M. The other light beam is guided through an optical path bent by optical-path bending mirrors mC1, mC2, and mC3 to the photosensitive drum 11C.

One of light beams deflected at the lower tier of the polygon mirror 7 is guided through an optical path bent by an optical-path bending mirror mY to the photosensitive drum 11Y. The other light beam is guided through an optical path bent by an optical-path bending mirror mK to the photosensitive drum 11K.

Thus, the photosensitive drums 11Y, 11M, 11C, and 11K are scanned with light beams from the laser light sources 1Y, 1M, 1C, and 1K, respectively. The photosensitive drums 11Y, 11M, 11C, and 11K are rotated clockwise at constant velocity, are uniformly charged by charging rollers TY, TM, TC, and TK, which serve as charging units, and are scanned with the corresponding light beams to write a yellow image, a magenta image, a cyan image, and a black image onto the photosensitive drums 11Y, 11M, 11C, and 11K, respectively, where the corresponding electrostatic latent images (negative latent images) are formed.

The electrostatic latent images are developed in reverse by developing devices GY, GM, GC, and GK to form a yellow toner image, a magenta toner image, a cyan toner image, and a black toner image on the photosensitive drums 11Y, 11M, 11C, and 11K, respectively.

The toner images of respective colors are transferred onto an intermediate transfer belt 17. That is, to the intermediate transfer belt 17, the yellow toner image is transferred from the photosensitive drum 11Y by a transfer unit 15Y, and the magenta toner image, the cyan toner image, and the black toner image are transferred sequentially from the photosensitive drums 11M, 11C, and 11K by transfer units 15M, 15C, and 15K, respectively.

In this manner, the toner images of yellow, magenta, cyan, and black are sequentially superimposed on the intermediate transfer belt 17 to form a full-color image. The full-color image is transferred onto a printing sheet, and then fixed by a fixing device (not shown) to the printing sheet. Alternatively, the toner images can be directly formed and fixed onto a printing sheet instead of use of the intermediate transfer belt 17.

In FIG. 3, the scanning lenses 8Y and 8M, on which light beams deflected to the right from the polygon mirror 7 are incident, are separated from each other. However, the scanning lenses 8Y and 8M can be stacked together into a two-tier structure. The scanning lenses 8C and 8K, on which light beams deflected to the left from the polygon mirror 7 are incident, can also be stacked together into a two-tier structure.

A ring-band structure and an area A, which are constituent elements of the present invention although not shown in FIGS. 1 to 3 and to be described later, are formed on at least any one of lens surfaces of the coupling lens 3 and the cylindrical lens 5.

To reduce a size of the optical scanning device, it is preferable to arrange the scanning lens 8 (the scanning lenses 8Y to 8K) near the polygon mirror 7 serving as the deflecting unit, and set lateral magnification rate in the sub-scanning direction of a scanning optical system to be "equal to or larger than minus 200 percent". However, in such a magnifying optical system, negative effects due to a temperature fluctuation or manufacturing tolerance increase, leading to large fluctuation in beam spot size on the scanning surface due to environmental fluctuation such as temperature fluctuation.

By performing "correction of fluctuation in focal point position caused by environmental fluctuation" by using a diffraction lens surface having a ring-band structure, and expanding a depth allowance by using the area A, the negative effects caused by temperature fluctuation, erection tolerance, and manufacturing tolerance can be suppressed, whereby a beam spot size is stabilized.

If "the lateral magnification rate in the sub-scanning direction" of a scanning lens is set "larger than minus 500 percent", the size of the optical scanning device cannot be reduced and advantages of the ring-band structure and the area A cannot be attained. Therefore, as defined by the appended claim 9, the lateral magnification rate in the sub-scanning direction of the scanning lens should preferably be set "equal to or larger than minus 200 percent and equal to or smaller than minus 500 percent".

In the above example, the scanning lens (the scanning lens 8 and the scanning lenses 8Y to 8K) is formed of one scanning lens in the optical scanning device. However, it is applicable to employ two or more scanning lenses constituting an fθ lens, as has been widely employed in the conventional technologies.

If the scanning lens is formed of one lens as defined by the appended claim 10, the optical scanning device can be made smaller and cost reduction can be achieved. In this case, however, the number of parameters available for designing a lens decreases, making it difficult to reduce negative effects caused by temperature fluctuation or manufacturing tolerance.

In the optical scanning device according to the embodiment, the ring-band structure and the area A have functions for effectively reducing the above-mentioned negative effects. Therefore, the negative effects due to the configuration of the one scanning lens can be reduced while the above-mentioned advantages are retained.

The aperture (the aperture 12 and the apertures 12Y to 12K) is employed to perform beam shaping to effectively suppress fluctuation in beam spot size as described above. However, when the aperture is provided, light diffraction at the aperture affects the beam profile of a beam spot, turning the beam profile to "the profile with a side lobe accompanying a main lobe".

Meanwhile, light diffraction also occurs at the area A. As a result, the beam profile of a beam spot on a focusing surface is to be "formed under the complex effect of light diffraction by the aperture and light diffraction by the area A". Therefore, the beam profile of the beam spot can be changed by changing a phase distribution of the area A. Thus, "an increase in a beam spot size can be suppressed and the shrinkage of a depth allowance can be reduced or prevented".

FIGS. 4A to 4D depict four patterns of "phase distribution" of the area A.

The phase distribution of the area A (dark-colored portions) of FIGS. 4A to 4D corresponds to a distribution of height h' shown in FIG. 4A. The height h' is set so that a phase difference is determined to be a value other than $2\pi$ (rad) with respect to an operation wavelength $\lambda$. If the phase distribution is given by "two stages of height zero and height h'" as shown in FIGS. 4A to 4D, the height h' should preferably be set so that the phase difference is determined to be a value around $\pi$ (rad).

A phase difference $\theta$ (rad) is obtained by the following Equation:

$$\theta = 2\pi(n-1)h'/\lambda$$

where h' represents height of the area A, $\lambda$ represents operation wavelength, and n represents refractive index of the material of the area A.

In the example shown in FIGS. 4A to 4D, the heights of the phase distribution are set in two stages. However, the heights can be set in three or more stages or can be set to change continuously. With such a configuration, the phase distribution can be more flexibly designed, which is preferable.

A preferable shape of the beam profile of a beam spot formed on the focusing surface is "a shape symmetric with respect to the main-scanning direction and to the sub-scanning direction". Therefore, a pattern of a phase distribution of the area A is preferably set to be a pattern having "a height distribution that is axisymmetric" with respect to a straight line passing through the center of "a phase distribution pattern of the area A" and being parallel to the main-scanning direction and axisymmetric with respect to a straight line passing through the center and being parallel to the sub-scanning direction, as shown in FIGS. 4A to 4D.

The phase distribution patterns shown in FIGS. 4A and 4B are examples of "a phase distribution of two-dimensionally flexible design" using a pixel structure. Concretely, FIG. 4A depicts an example of a phase-distribution pattern in which "symmetry with respect to the main-scanning direction does not coincide with that to the sub-scanning direction". FIG. 4B depicts an example of a phase distribution pattern in which "symmetry with respect to the main-scanning direction coincides with that to the sub-scanning direction".

FIG. 4C depicts an example of an elliptical ring-shape phase distribution pattern, and FIG. 4D depicts an example in which "parts of an elliptical ring-shape phase distribution pattern (or a circular ring-shape distribution pattern) are combined". All the patterns shown in FIGS. 4A to 4D can be employed as preferable patterns of the phase distribution of the area A. Further, the pattern of the phase distribution of the area A is not limited to those examples.

However, in the embodiment, considering that the area A is formed of "a shape similar to the ring-band structure", it is more preferable to employ the elliptical ring-shape pattern shown in FIG. 4C, other elliptical patterns or circular ring-shape patterns although they are not shown, and the pattern shown in FIG. 4D.

In the optical scanning device shown in FIGS. 1 to 3, the scanning lens has magnification rates in the main-scanning direction and the sub-scanning direction that are different from each other. Therefore, as shown in FIGS. 4A, 4C, and 4D, it is more preferable to employ the phase distribution pattern that does not have "90 degrees rotation symmetry". Thus, the most preferable pattern of the phase distribution of the area A is a pattern having a height distribution that is axisymmetric with respect to the main-scanning direction and to the sub-scanning direction as shown in FIG. 4C, and does not have "90 degrees rotation symmetry" as shown in FIGS. 4A, 4B, and 4D.

"Expansion of a depth allowance by the area A" is described below.

Simulation results obtained when the area A is designed so as to satisfy the above conditions are described below. The area A that is capable of expanding the depth allowance is also referred to as "a depth expanding portion" hereinafter.

Figure 5:
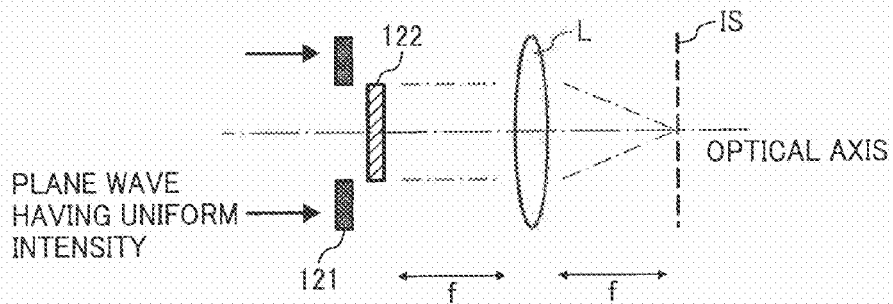
FIG. 5 is a schematic diagram of an optical system used for a simulation of expanding a depth allowance according to the embodiment.

A "simulation model" as shown in FIG. 5 is employed to generalize the explanation.

In FIG. 5, reference numeral 121 denotes an aperture, reference numeral 122 denotes a depth expanding element, reference symbol L denotes a lens, and reference symbol IS denotes a focusing surface.

The depth expanding element 122 is "an optical element provided for simulation" on which the area A, that is, the depth expanding portion is formed.

An incident light beam is of "a plane wave having uniform intensity", and is shaped into a beam having a cross section of a desired shape through the aperture 121. The depth expanding element 122 is attached closely (zero distance) to the aperture 121, and gives a phase distribution on the light beam due to the act of the depth expanding portion. The lens L is an aplanatic lens having a focal length indicated by f of FIG. 5, and causes the light beam to be focused into a beam spot at the position of an optical axis of the focusing surface IS. The aperture 121 and the depth expanding element 122 are disposed at the position of a front focal plane of the lens L. The following parameters are used in the simulation.

The shape of the opening of the aperture 121: circle
The diameter of the opening of the aperture 121: 930 micrometers
The focal length f of the lens L: 50 millimeters
The operation wavelength: 632.8 nanometers In the simulation model, an incident light beam is assumed to be "a plane wave having uniform intensity". Meanwhile, the intensity distribution of a semiconductor laser beam used as a light source in the optical scanning device is usually the Gaussian distribution. However, a result of the simulation is effective even when the light beam is the Gaussian beam. This is because a method for expanding the depth allowance in the embodiment is "a method of controlling a beam profile on a focusing surface by controlling a phase distribution only". Under the above-mentioned conditions, the wave-optical simulation is performed.

The lens L is assumed to be "a single lens in a simplified form" modified from the cylindrical lens 5 and the scanning lens 8 in the optical arrangement shown in FIG. 1. In other words, the optical system configuration in the simulation is different from that used in the actual optical scanning device. However, the qualitatively same effect as described below can be attained when used in the actual optical scanning device.

An example in a case of not using the depth expanding element 122 is described below.

Figure 6A:
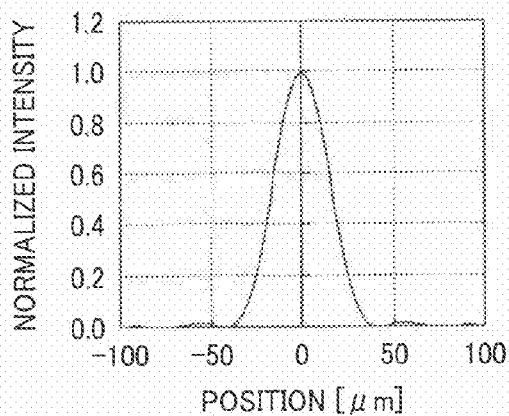
FIG. 6A is a graph of a beam profile when the area A is not used.

FIG. 6A depicts a simulation result of "a beam profile at the position of the focusing surface" when the depth expanding element 122 is not used. The peak intensity is normalized to one. Under these conditions, the peak intensity of a side lobe is 0.016 (1.6% of the peak intensity).

Figure 6B:
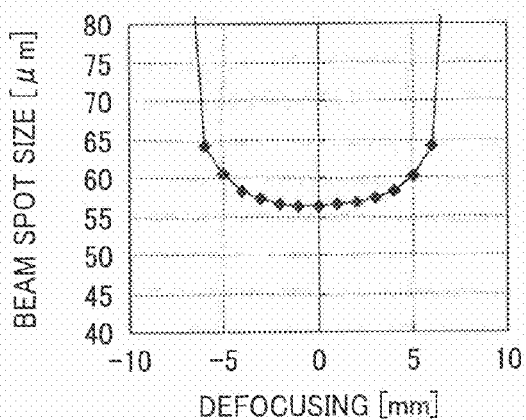
FIG. 6B is a graph of a depth curve when the area A is not used.

FIG. 6B depicts "a depth curve with beam spot size (micrometers) on the vertical axis and defocusing (millimeters), which is a distance shifted from a focal point of the lens, on the horizontal axis". The beam spot size corresponds to the diameter of a portion that takes a value of "1/e²" with respect to the peak intensity. If the depth allowance is calculated on the assumption that "the allowable range of the beam spot size is within 105% of the minimum beam spot size", the depth allowance becomes 8.9 millimeters in the simulation of FIG. 6B.

Simulation results in a case of using five different depth expanding elements (five different phase distribution patterns of the area A) are described below with reference to FIGS. 7A to 7C, 8A to 8C, 9A to 9C, 10A to 10C, and 11A to 11C. Each of FIGS. 7A, 8A, 9A, 10A, and 11A depicts "a phase distribution pattern of the area A of the depth expanding element". Each of FIGS. 7B, 8B, 9B, 10B, and 11B depicts "a beam profile at the position on the focusing surface". Each of FIGS. 7C, 8C, 9C, 10C, and 11C depicts "a depth curve" with beam spot size on the vertical axis and defocusing on the horizontal axis. In the "beam profile", "the peak intensity is normalized to one".

In each of the depth expanding elements shown in FIGS. 7A, 8A, 9A, 10A, and 11A, the area A corresponds to "darkly-colored portions". The phase difference between the area A and background portions corresponding to "white-colored portions" is determined to be "π" from the Equation $\theta=2\pi(n-1)h'/\lambda$, where h' is height of the area A. That is, "the white-colored portion corresponds to zero while the darkly-colored portion corresponds to π".

The depth expanding elements shown in FIGS. 7A, 8A, 9A, 10A, and 11A are referred to as depth expanding elements 1 to 5, respectively.

Each of the depth expanding elements 1 to 5 has the area A having a phase distribution pattern of "a circular hollow ring" with "an outer diameter and an inner diameter indicated in the respective figures". The center of the circular phase distribution pattern coincides with "the center of the aperture 121".

As shown in FIGS. 7B, 8B, 9B, 10B, and 11B, even when the depth expanding elements 1 to 5 are used, the peak intensity of a high-order side lobe is low (a high-order beam with the high light intensity is not generated in a range outward with respect to the graph shown in each of FIGS. 7B, 8B, 9B, 10B, and 11B), while the light intensity of the main lobe is retained at the high level. Compared with the beam profile shown in FIG. 6A in which the depth expanding element is not used, "the peaks of side lobes adjacent to main lobes in the beam profiles are increasing" by using the depth expanding elements 1 to 5.

Furthermore, as can be found from the "depth curve" shown in each of FIGS. 7C, 8C, 9C, 10C, and 11C, fluctuation in beam spot size due to defocusing is decreasing by using the depth expanding elements 1 to 5, resulting in expanding the depth allowance.

An example in a case of using a phase type optical element with a structural pattern that does not have a depth expanding function is described below.

Figure 12A:
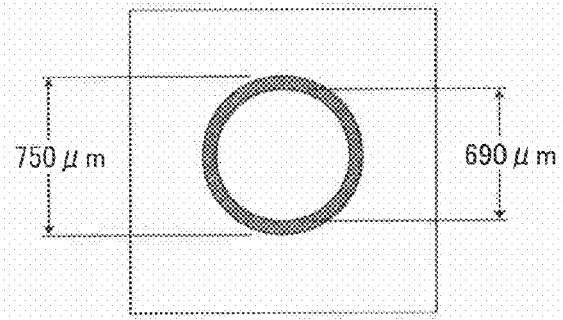
FIGS. 12A to 12C are schematic diagrams for explaining an example of a phase pattern that does not have a function for expanding a depth allowance.

A "phase distribution pattern" shown in FIG. 12A is, similar to those of the depth expanding elements 1 to 5, "a phase distribution pattern in a circular hollow ring shape having a phase difference of π" with "an outer diameter and an inner diameter". The center of the circular phase distribution pattern coincides with "the center of the aperture".

Figure 12B:
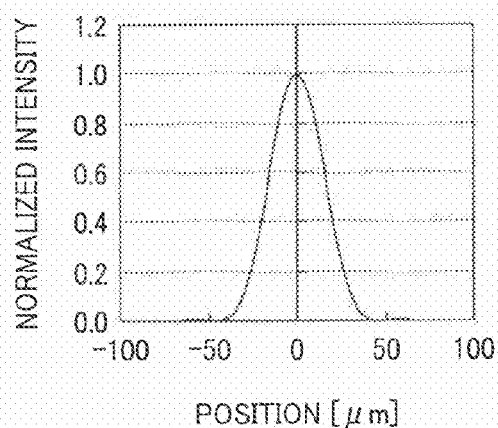
Figure 12C:
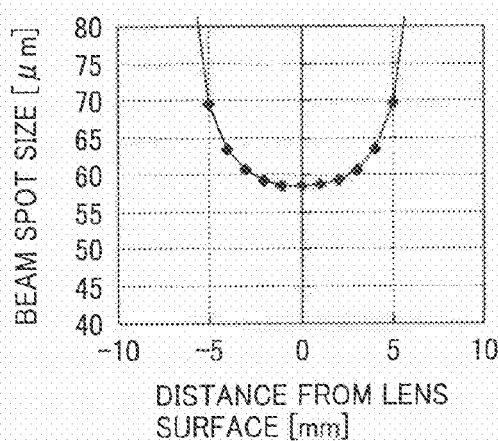

However, as shown in the beam profile of FIG. 12B, the peak of a side lobe adjacent to a main lobes is low. Besides, as can be seen from FIG. 12C, no function for expanding the depth allowance is obtained.

FIG. 13 is a table containing side-lobe peak intensity, depth allowance, and beam spot size, in an associated manner with respect to each side lobe of each of the depth expanding elements 1 to 5.

The peak intensity is normalized to one in "the beam profile". The depth allowance is calculated based on assumption that "the allowable range of the beam spot size is within 105% of the minimum beam spot size". In FIG. 13, "without depth expanding element" corresponds to the example shown in FIGS. 6A and 6B, and "conventional depth expanding element" corresponds to the "element with a phase distribution pattern that does not have a depth expanding function" shown in FIGS. 12A to 12C.

It can be found from FIG. 13 that "the depth allowance is expanded by using the depth expanding elements 1 to 5 that increase the peak intensities of side lobes, and as the peak intensity of the side lobe increases, the expansion rate of the depth allowance increases".

It can also be found from FIG. 13 that the depth allowance is shrunk when "the phase type optical element with a structural patter that does not have a phase expanding function" is used.

As described above, a use of a depth expanding element having the area A expands the depth allowance of a beam spot size near the position of the focal point of a lens. Therefore, it is not necessary to add a lens to a relay optical system and the like, which is advantageous for system layout. Further, high light use efficiency can be achieved.

Figure 14:
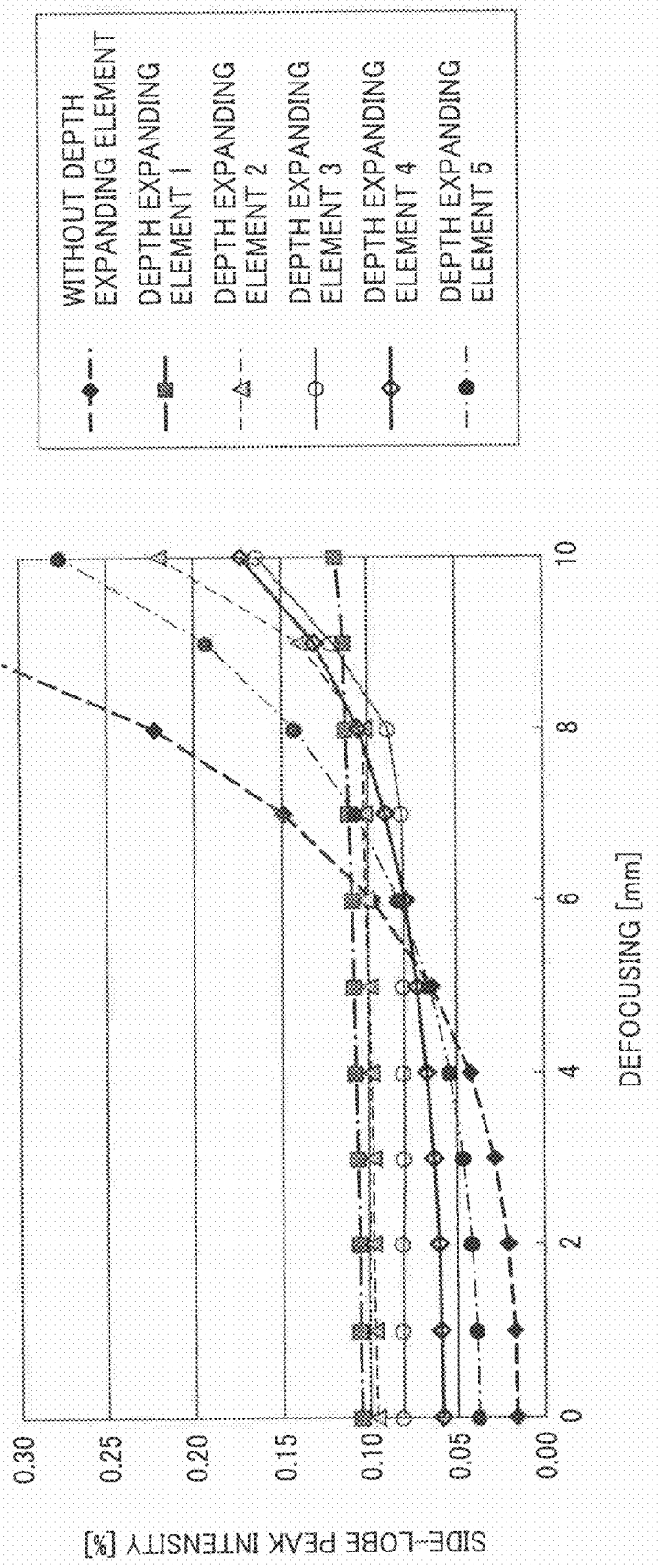
FIG. 14 is a graph of defocusing versus side-lobe peak intensity in situations when a depth allowance is expanded by using the area A and when a depth allowance is not expanded by using the area A.

FIG. 14 is a graph whose horizontal axis represents defocusing (millimeters) and vertical axis represents side lobe peak intensity (when main lobe peak intensity is a normalized value of one) in "a case of not using the depth expanding element" and "a case of using the depth expanding elements 1 to 5". When the phase distribution pattern of FIG. 12A is used, the distortion of a beam profile at a position other than the focal position is severe, where side lobe and main lobe overlap each other, making it impossible to distinguish the peak intensity of the side lobe from main lobe. Therefore, a case of use of the phase distribution pattern of FIG. 12A is not shown in the graph.

Referring to FIG. 14, at the focal position (the focusing surface position where defocusing is 0 millimeter), the side lobe peak intensity in the case of not using the depth expanding element is the smallest. However, in an area where defocusing is larger than 5 millimeters to 6 millimeters, the side lobe peak intensity is smaller when the depth expanding element is used.

While the phase distribution pattern in the shape of "a hollow circle (ring)" is described as an example of a phase distribution pattern of the area A, the shape of the phase distribution pattern is not limited to this example. As described above, various patterns similar to the ring-band structure can be applicable, such as circular patterns, elliptical patterns, and elliptical ring-shape patterns.

"Correction of fluctuation in focal position on a focusing surface caused by environmental fluctuation" by using a ring-band structure is described below.

Figure 15A:
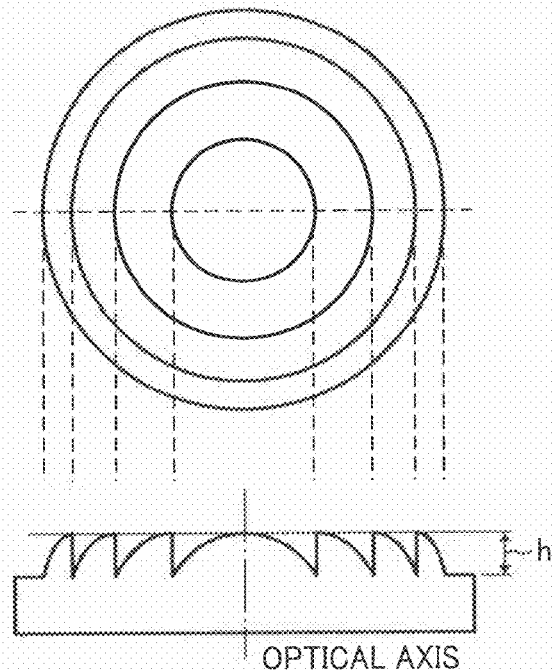
FIGS. 15A to 15C are schematic diagrams of a conventional diffraction lens.
Figure 15B:
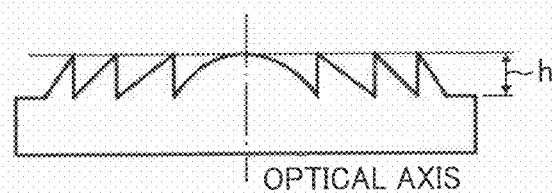
Figure 15C:
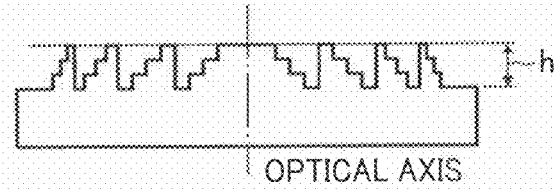

A diffraction lens is widely known as a lens that has a function for "correcting a fluctuation in focal position on a focusing surface caused by environmental fluctuation". FIGS. 15A to 15C are schematic diagrams of a conventional diffraction lens (FIG. 15A depicts a diffraction lens viewed in the optical axis direction and in a direction perpendicular to the optical axis, and FIGS. 15B and 15C depict the diffraction lens viewed in the direction perpendicular to the optical axis).

FIG. 15A depicts a structure that is given by dividing "a typical lens surface shape" into ring-bands, and shaping each ring-band to give it a height "h". FIG. 15B depicts a structure that is given by approximating "sloped portions of the ring-bands" of FIG. 15A with a straight line (sectional shape becomes a serrated shape).

FIG. 15C depicts a structure that is given by "approximating the sectional shape of the ring-band of FIG. 15A with a stepped shape".

As shown in FIGS. 15A to 15C, boundary portions between adjacent ring-bands are shaped to form "a discontinuous plane with the height difference h kept between adjacent ring-bands". The discontinuous plane is made up to have "a function for correcting fluctuation in focal position on a focusing surface caused by environmental fluctuation".

In the structures shown in FIGS. 15A to 15C, the discontinuous plane shape of the ring-band structure has power at an operation wavelength (a design wavelength), being capable of focusing an incident light beam.

Figure 16:
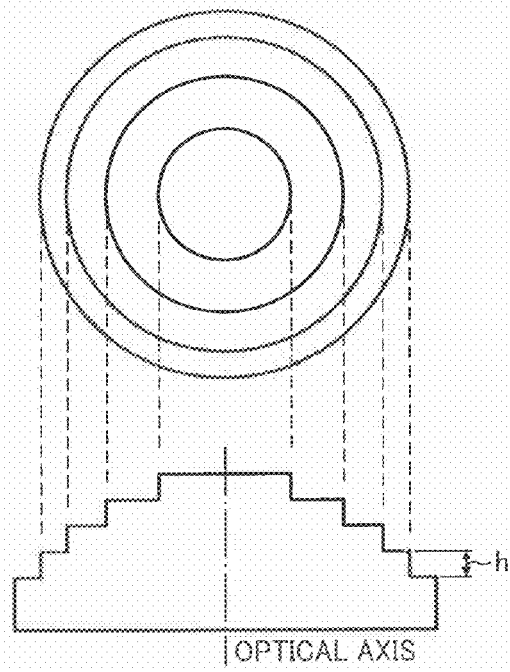
FIG. 16 is a schematic diagram of a diffraction lens that does not have power at an operation wavelength.

FIG. 16 is a schematic diagram of a diffraction lens that does not have power at an operation wavelength. Each of ring-bands constituting the ring-band structure has a flat surface on a plane perpendicular to the optical axis of the lens. The ring-band structure is, thus, formed into "a multi-stepped shape in which the height of each ring-band is set uniformly lower than that of an adjacent ring-band in a stepwise manner from the inner side towards the outer side".

The ring-band height "h" in FIGS. 15A to 15C and 16 is set to give "a phase difference integer times as large as $2\pi$" with respect to an operation wavelength.

When a semiconductor laser beam is used as a laser light source and if a temperature inside the optical scanning device increases, the wavelength of a laser beam emitted from the laser light source usually shifts towards a long wavelength band and the power of a diffraction lens increases in proportion to the wavelength.

Meanwhile, increase in temperature leads to expansion of a refractive lens (especially, a resin lens). As a result, the curvature of the surface of the lens is reduced, shrinking the power of the lens. Therefore, by providing both a diffraction lens and a refractive lens in one optical system, fluctuation in power caused by temperature fluctuation can be compensated and suppressed by the effects due to the diffraction lens and the refractive lens. In other words, the power of the surface of the diffraction lens fluctuates inversely with "the fluctuation in power due to expansion or shrinkage of the lens caused by temperature fluctuation". Thus, fluctuation in focal position on a focusing surface caused by temperature fluctuation can be suppressed.

Figure 17A:
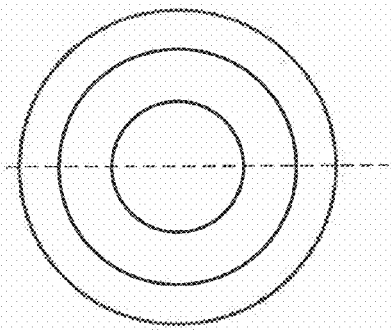
FIGS. 17A to 17C are schematic diagrams of examples of discontinuous planes of diffraction lenses.
Figure 17B:
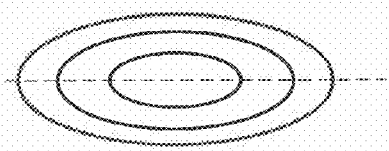
Figure 17C:
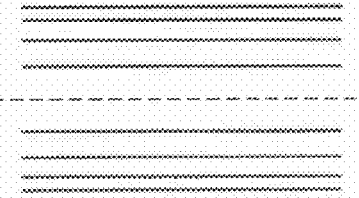

FIGS. 17A to 17C are schematic diagrams of three different ring-band structures of the diffraction lens. FIG. 17A depicts ring-bands formed into "a concentric shape" (a concentric diffraction lens surface). FIG. 17B depicts ring-bands formed into "a concentric elliptical shape" (an elliptical diffraction lens surface). FIG. 17C depicts ring-bands formed into "a strip shape divided with straight lines" (a linear diffraction lens surface).

With the discontinuous plane shape shown in FIGS. 17B and 17C, "anamorphic diffraction power" can be obtained.

In the optical scanning device, "a magnification rate of an optical system in the main-scanning direction is different from that in the sub-scanning direction". Therefore, it is preferable to set such that the fluctuation amounts of the focal position on a focusing surface in the main-scanning direction and in the sub-scanning direction are different from each other. Therefore, it is preferable to use a single diffraction lens surface having an elliptical ring-band structure as shown in FIG. 17B, or to combine a diffraction lens surface having a concentric ring-band structure as shown in FIG. 17A with a diffraction lens surface divided into bands with straight lines as shown in FIG. 17C.

The optical scanning device generally has a large magnification rate in the sub-scanning direction and a relatively small magnification rate in the main-scanning direction. Therefore, regarding to the fluctuation in focal position on a focusing surface caused by temperature fluctuation, the fluctuation in the sub-scanning direction is more problematic.

Therefore, even when only the single "diffraction lens surface having a concentric ring-band structure" as shown in FIG. 17A or the single diffraction lens surface as shown in FIG. 17C is employed, the above-mentioned effects can be attained to some extent.

The above-described technique for changing the power of the diffraction lens surface depending on temperature fluctuation corresponds to a technique for adjusting a wavefront of a light beam by the diffraction lens surface. That is, by adjusting a shape of the ring-band structure (the diffraction lens surface), it is possible to generate a wavefront capable of reducing aberration caused by temperature fluctuation.

In the above examples, "the depth expanding function" by the area A and "the function for correcting adverse effects caused by environmental fluctuation" by the ring-band structure are described separately. However, these functions can be integrated and implemented at the same time.

Integration of the above functions is described below.

Figure 7A:
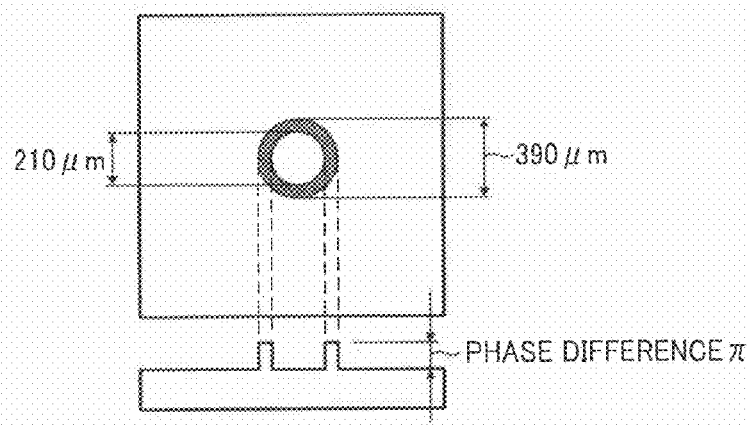
FIGS. 7A to 7C are schematic diagrams for explaining an example of a phase pattern of the area A.
Figure 7B:
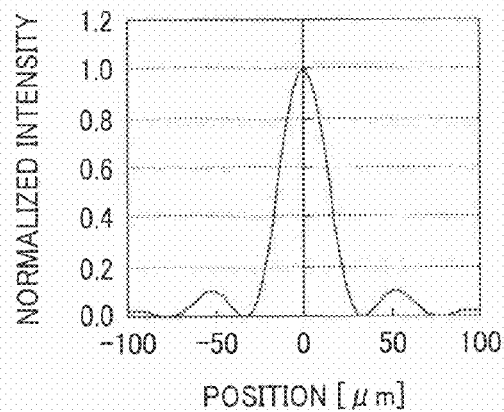
Figure 7C:
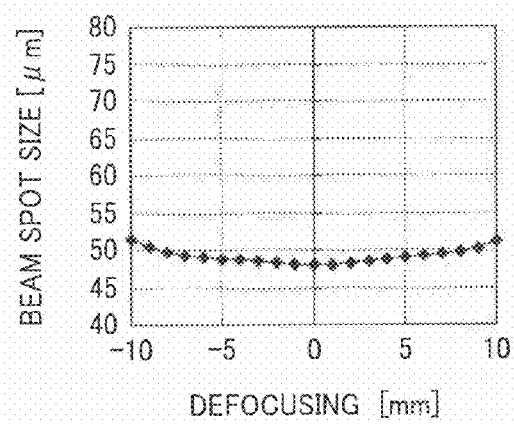
Figure 8A:
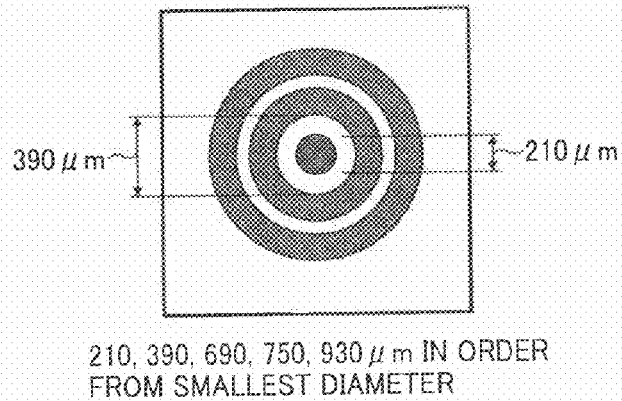
FIGS. 8A to 8C are schematic diagrams for explaining another example of the phase pattern of the area A.
Figure 8B:
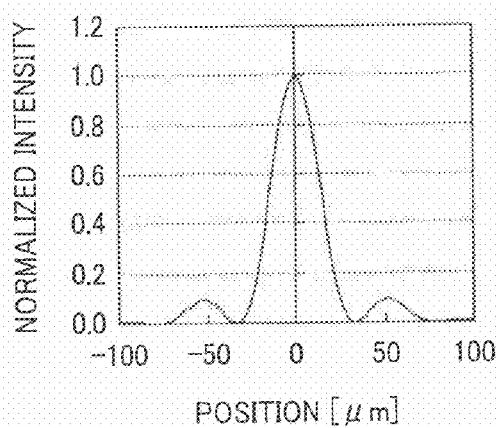
Figure 8C:
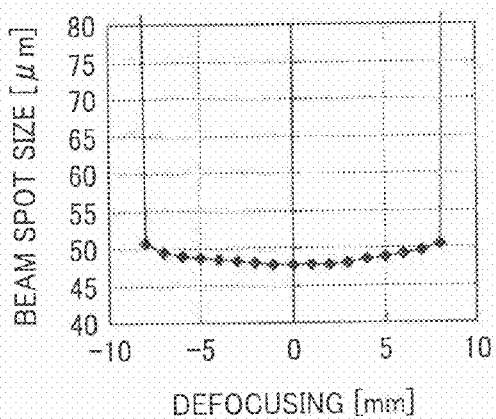
Figure 9A:
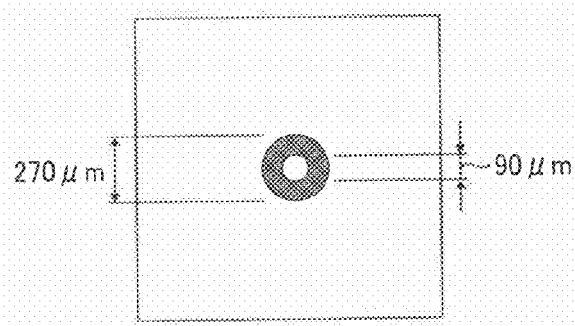
FIGS. 9A to 9C are schematic diagrams for explaining still another example of the phase pattern of the area A.
Figure 9B:
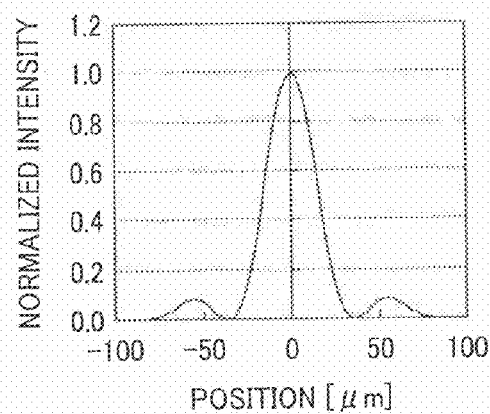
Figure 9C:
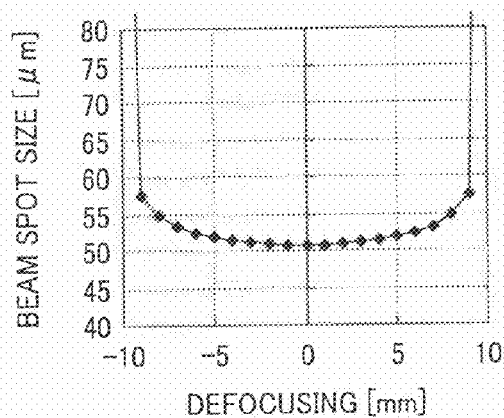
Figure 10A:
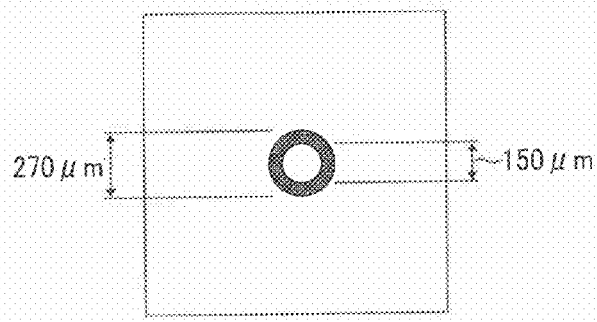
FIGS. 10A to 10C are schematic diagrams for explaining still another example of the phase pattern of the area A.
Figure 10B:
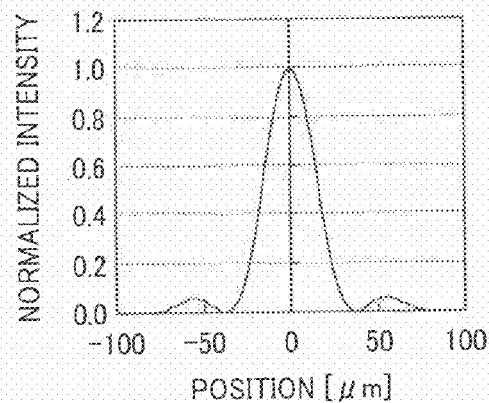
Figure 10C:
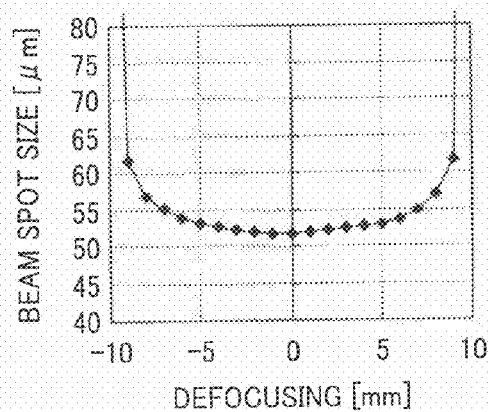
Figure 11A:
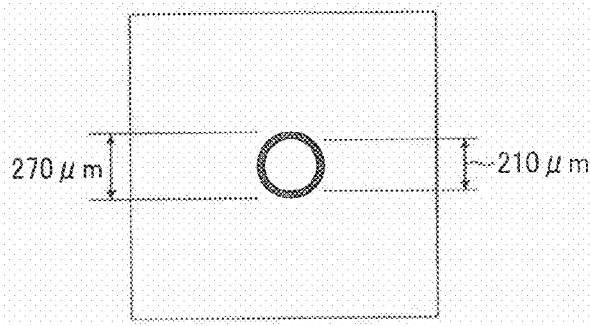
FIGS. 11A to 11C are schematic diagrams for explaining still another example of the phase pattern of the area A.
Figure 11B:
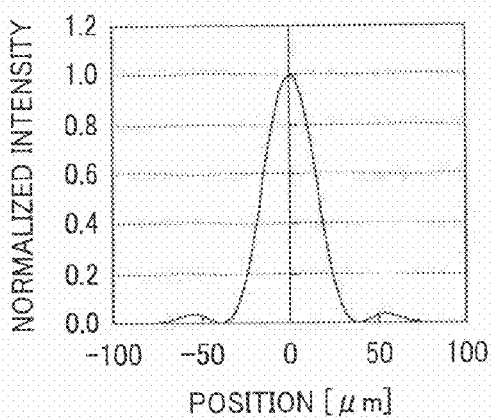
Figure 11C:
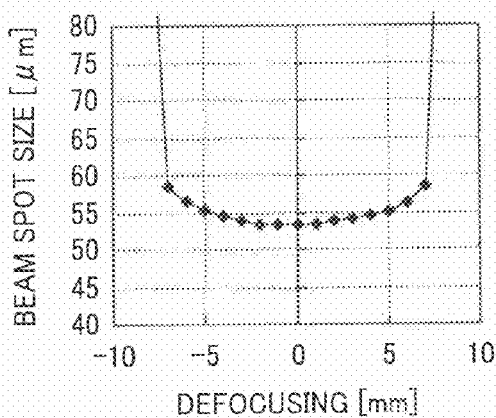

The diffraction lens shown in FIG. 16, which has a ring-band structure formed into "a multi-stepped shape in which the height of each ring-band is set to be lower than that of an adjacent ring-band by the height difference h (phase difference of $2\pi$) in a stepwise manner from the inner side towards the outer side", is assumed to be integrated with "the area A that is formed into a circular ring shape with the phase difference of $\pi$" shown in FIG. 7A, on a single lens surface.

In this example, the diffraction lens surface having the ring-band structure "does not have power at an operation wavelength". When a temperature inside the optical scanning device increases, the wavelength of a semiconductor laser beam as a laser light source shifts towards a long wavelength band. At this time, due to the ring-band structure, "retardation in phase" of a transmitted beam at the peripheral portion of the ring-band structure is made smaller. Therefore, the transmitted beam can be converged.

The wavelength of a semiconductor laser beam varies by about 0.2 nanometer per degree due to temperature fluctuation. That is, if a temperature inside the optical scanning device changes by 20° C., the wavelength of a light beam is elongated by 4 nanometers. If the emission wavelength of a semiconductor laser beam is set to 655 nanometers as a design value, the wavelength change of 4 nanometers corresponds to 0.6% change with respect to an operation wavelength. Thus, phase variation of about 0.6% occurs in each ring-band of the ring-band structure.

In the ring-band structure of a diffraction lens surface, the tenth ring-band is set to be ten times higher (10 h) than the center of the ring-band structure, where "the height h is determined to give a phase difference of $2\pi$". Therefore, the phase difference between the center of the ring-band structure and the tenth ring-band of the same ring-band structure becomes $20\pi$. At this time, if the wavelength changes by 0.6%, the phase variation of $12\pi$ occurs. Due to such a large phase difference between the center of the ring-band structure and the peripheral portion of the ring-band structure, the beam shape is effectively changed by the ring-band structure (in this example, the transmitted beam is converged). Therefore, the diffraction lens surface with the ring-band structure can be effective even to a small wavelength change.

Meanwhile, the wavelength change of 0.6% has almost no effect on the "depth expanding function" of the area A. Therefore, even when a temperature inside the optical scanning device fluctuates, the depth expanding function by the area A can be effective. In this manner, even when the diffraction lens surface with the ring-band structure is integrated with the depth expanding portion of the area A on a single lens surface, each of the functions can be separately implemented.

While the "multi-stepped shape" is used as an example of the ring-band structure of a diffraction lens surface in the above description, "a surface that has power" as shown in FIGS. 15A to 15C can also be integrated with the area A on a single lens surface in the same manner.

As described above, because both the ring-band structure of the diffraction lens surface and the area A having the depth expanding function are "optical elements that act on phase", they can be "integrated with each other on a single lens surface", as defined by the appended claim 1. In this manner, integrating the ring-band structure with the area A on a single lens surface (a coupling lens and/or a cylindrical lens) suppresses the number of components to be arranged in the optical scanning device and prevents new optical elements from being added to the optical scanning device. Therefore, light loss due to reflection by surfaces of optical elements can be effectively reduced, making it possible to increase a processing speed. Furthermore, the optical element can be made of resin, which enables cost down. Besides, even when an optical element made of resin is used, curvature of a focusing surface can be corrected and depth expansion can be attained even when temperature fluctuates.

Detailed explanation is given below about "integration of the ring-band structure with the area A on a single lens surface".

Figure 18A:
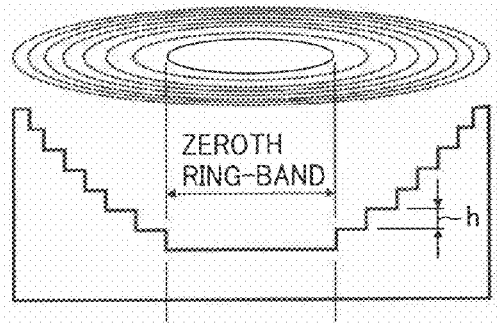
FIGS. 18A to 22C are schematic diagrams for explaining how the area A is integrated with a diffraction lens surface according to the embodiment.

FIG. 18A depicts an example of a ring-band structure formed in a multi-stepped shape. In the ring-band structure, the zeroth ring-band has an elliptical shape, and the first or later ring-band has an elliptical ring shape. Each ring-band height is "raised in a stepwise manner from the inner side towards the outer side with the height difference h (phase difference of 2π) kept between adjacent ring-bands".

Figure 18C:
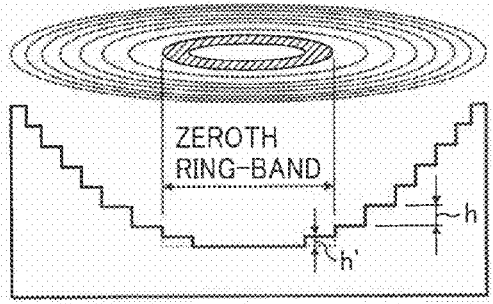
Figure 18B:
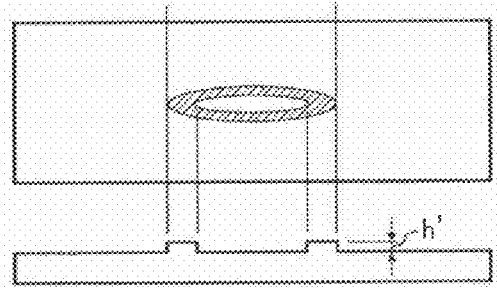

FIG. 18B depicts the area A constituting the depth expanding portion (indicated by "depth expanding element" in FIG. 18B). The phase distribution pattern of the area A has "an elliptical ring shape" that is similar to the elliptical ring shape of each ring-band of the ring-band structure. The height h' corresponding to the phase difference is set to be half of the height difference h.

Figure 18D:
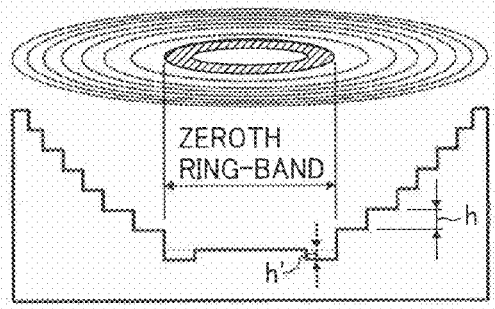

FIGS. 18C and 18D depict lens surface shapes of lenses on which the area A of FIG. 18B is integrated within the zeroth ring-band of the ring-band structure of FIG. 18A such that their centers and longitudinal directions coincide with each other. FIG. 18C depicts an example in which the ring-band structure and the ring-shape area (the area A) are integrated with each other "by adding". FIG. 18D depicts an example in which the ring-band structure and the ring-shape area are integrated with each other "by subtracting". The lens surfaces of FIGS. 18C and 18D have optically the same functions.

Figure 19A:
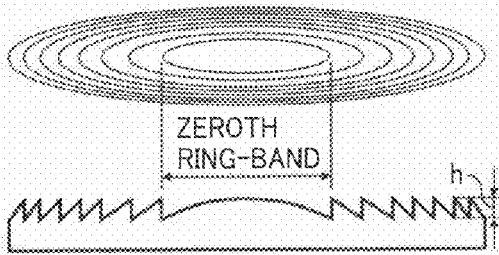

FIG. 19A depicts an example of a ring-band structure of the same type as shown in FIG. 15B. In the ring-band structure, each ring-band has an elliptical ring shape and boundary portions between adjacent ring-bands are shaped to form a discontinuous plane with the height difference h (phase difference of 2π) kept between adjacent ring-bands.

Figure 19C:
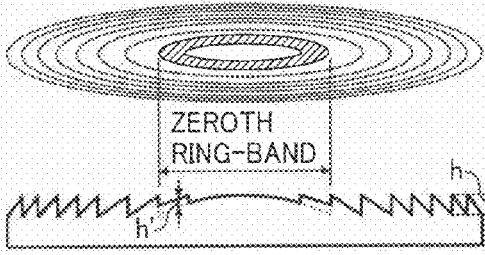
Figure 19B:
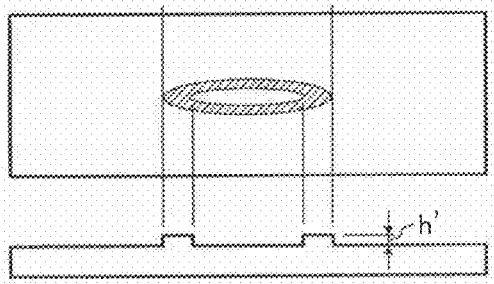

FIG. 19B depicts the area A constituting the depth expanding portion. The phase distribution pattern of the area A has "an elliptical ring shape" that is similar to the elliptical ring shape of each ring-band of the ring-band structure. The height h' corresponding to the phase difference is set to be half of the height difference h.

Figure 19D:
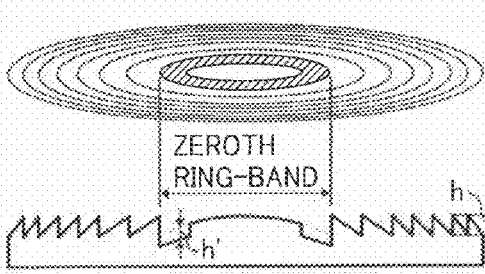

FIGS. 19C and 19D depict lens surface shapes of lenses on which the area A of FIG. 19B is integrated within the zeroth ring-band of the ring-band structure of FIG. 19A such that their centers and longitudinal directions coincide with each other. FIG. 19C depicts an example in which the ring-band structure and the area A are integrated with each other "by adding". FIG. 19D depicts an example in which the ring-band structure and the area A are integrated with each other "by subtracting". The lens surfaces of FIGS. 19C and 19D have optically the same functions.

Formation of the surface structures of FIGS. 18C, 18D, 19C, and 19D is described below.

For forming the surface structures, the following two methods are applicable. That is, a method of using a semiconductor process such as etching, and a cutting process using a cutting tool. The semiconductor process is not suitable for forming a continuous shape with good precision. It may be possible to form a continuous shape by dividing the process into small steps in the semiconductor process. However, the shape obtained in such a manner reduces diffraction efficiency, which is not preferable. Alternatively, the "cutting process" is suitable for forming a continuous shape, which is preferable for forming a diffraction lens surface with high diffraction efficiency.

In the cutting process, at least one of a mold that transfers the surface structure and a cutting tool is rotated to form the mold. To simplify the process, it is preferable to form "all ring-bands of a ring-band structure to have similar shapes". Further, the ring-band of the area A is preferably formed into the shape similar to those of the ring-bands of the ring-band structure.

The ring-band structure is formed based on "the magnification rates in the main-scanning direction and in the sub-scanning direction" while the shape of the phase distribution pattern of the area A is largely affected by the shape of an aperture. Therefore, as defined by the appended claim 1, the shape of the aperture is optimized so that the structures of the area A and the aperture are made similar to each other.

In the surface structures of FIGS. 18D and 19D, "concave portions with narrow widths" are formed due to ring-bands corresponding to the area A. Generally, it is difficult to process such concave portions in the cutting process. However, with the surface structures of FIGS. 18C and 19C, the concave portions can be precisely processed by using a cutting tool.

In this manner, to precisely process the surface structure through the cutting process, it is preferable to integrate the area A with the ring-band structure in which all ring-bands including the ring-band corresponding to the area A are formed into a surface structure such that "every ring-band is uniformly kept either higher or lower than an adjacent inner ring-band".

The surface structures of FIGS. 18C and 19C are examples in which all ring-bands including the ring-band corresponding to the area A are formed such that "every ring-band is uniformly kept higher than an adjacent inner ring-band".

The structure of a mold for forming the surface structures of FIGS. 18C and 19C by molding or nanoimprint is formed such that "every ring-band is uniformly kept lower than an adjacent inner ring-band". While the area A of FIGS. 18C and 19C has "an elliptical shape formed of a single elliptical ring-band", the shape of the area A is not limited to this example and can be a concentric elliptical shape formed of a plurality of concentric elliptical ring-bands.

As described above, in a typical optical scanning device, an imaging optical system placed between a laser light source and a scanning surface has magnification rates "in the main-scanning direction and in the sub-scanning direction that are different from each other". Therefore, it is preferable to set such that the fluctuation amounts of the focal position on a focusing surface in the main-scanning direction and in the sub-scanning direction are different from each other.

To suppress fluctuation in focal position on a focusing surface in the main-scanning direction and in the sub-scanning direction, it is preferable to employ a diffraction lens surface having an elliptical ring-band structure as shown in FIG. 17B, or to combine a diffraction lens surface having a concentric ring-band structure as shown in FIG. 17A with a diffraction lens surface having a linear ring-band structure as shown in FIG. 17C. When a diffraction lens surface having a concentric ring-band structure is combined with a diffraction lens surface having a linear ring-band structure, the area A can be integrated with any one of the diffraction lens surfaces or both. However, the most preferable structure is to integrate the area A with the diffraction lens surface having a concentric ring-band structure, which enables "expansion of a depth allowance in the main-scanning direction and in the sub-scanning direction".

The ring-band structure and the area A are formed on a lens surface of at least one of a cylindrical lens and a coupling lens.

As described above, the optical scanning device generally has a large magnification rate in the sub-scanning direction and a relatively small magnification rate in the main-scanning direction. Therefore, regarding to the fluctuation in focal position on a focusing surface caused by temperature fluctuation, the fluctuation in the sub-scanning direction is more problematic. Considering the above fact, it is applicable to employ only a diffraction lens surface having a concentric ring-band structure" as shown in FIG. 17A or only a diffraction lens surface having a linear ring-band structure as shown in FIG. 17C. In this case, it is preferable to configure such that the fluctuation in focal position on a focusing surface in the sub-scanning direction is minimized.

To "expand a depth" in the most effective manner, it is most preferable to form a diffraction-lens surface by integrating the area A having the depth expanding function with a ring-band structure having an elliptical shape. Further, it is most preferable to arrange the elliptical diffraction lens surface with the depth expanding function on "a plane portion of a cylindrical lens".

If the area A is arranged at a position distant from an optical axis of a diffraction lens surface, "high-order diffracted light that is to be a noise light" is often generated, which leads to degradation in image forming operation and reduces a main lobe (a light beam to be used for the image forming operation). Therefore, at least a portion of the area A should preferably be arranged at a position "near an optical axis of a diffraction lens surface". Concretely, it is preferable to arrange at least a portion of the area A "on the inner side of the fifth ring-band" in the ring-band structure of the diffraction surface. It is most preferable to arrange whole of the area A "on the inner side of the fifth ring-band" in the ring-band structure of the diffraction surface (claim 3).

The area A can be integrated with a ring-band structure on either "a diffraction lens surface that has power" as shown in FIGS. 15A to 15C or on "a diffraction lens surface formed into a multi-stepped shape" as shown in FIG. 16. However, it is most preferable to integrate the area A with "a diffraction lens surface formed into a multi-stepped shape" as shown in FIG. 16.

"The other lens surface" of the lens that has a ring-band structure with the area A on one surface can be formed into either a refractive surface or a diffraction lens surface. However, if the other surface is formed into the diffraction lens surface that "has power" as shown in FIGS. 15A to 15C, optical characteristics often degrades due to decentering between lens surfaces. Alternatively, if the other surface is formed into the "diffraction lens surface that does not have power" as shown in FIG. 16, degradation of optical characteristics due to decentering between lens surfaces can be suppressed. Therefore, as defined by the appended claim 4, it is preferable to integrate the area A with the ring-band structure formed into "a multi-stepped shape in which the height of each ring-band is set to be uniformly higher or lower than that of an adjacent ring-band in a stepwise manner from the inner side towards the outer side".

As described above, to form the diffraction lens surface having the depth expanding function by using the cutting process, it is preferable to integrate the area A with a ring-band structure in which "all ring-bands including the ring-band corresponding to the area A" are formed such that "every ring-band is uniformly kept either higher or lower than an adjacent inner ring-band". Examples of such a structure are described below.

Figure 20A:
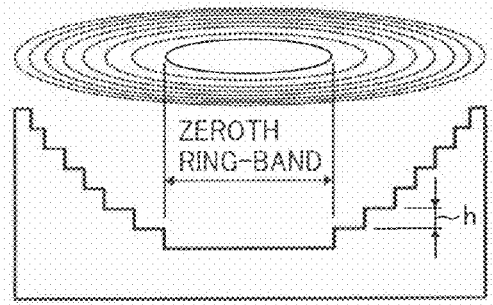
Figure 20B:
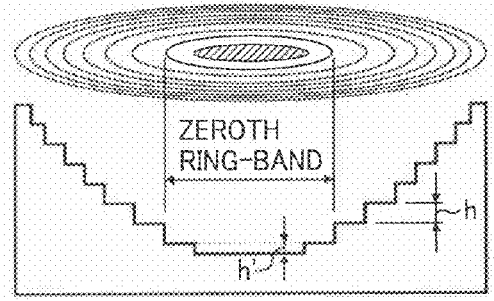
Figure 20C:
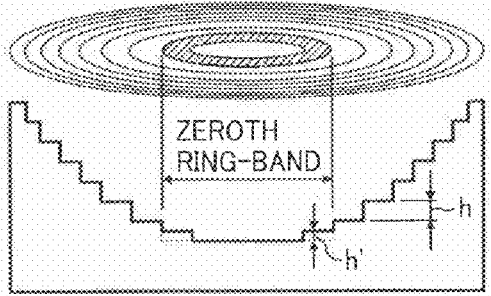

FIG. 20A depicts "a diffraction lens surface having an elliptical ring-band structure". FIGS. 20B and 20C depict "diffraction lens surfaces having depth expanding functions" formed by integrating the area A (portions indicated by hatched lines in FIGS. 20B and 20C) with the diffraction lens surface of FIG. 20A. "Portions indicated by dashed lines" in lower figures of FIGS. 20B and 20C indicate sectional shapes of the "diffraction lens surface with the ring-band structure" before the "area A" is integrated.

In the example shown in FIG. 20B, the area A used for expanding a depth is formed into an elliptical shape. The area A is integrated within the zeroth ring-band of an elliptical diffraction lens surface such that the centers and longitudinal directions of the zeroth ring-band and the area A coincide with each other and the height of the area A is set lower than that of the zeroth ring-band by the height h'. The area A is formed into the elliptical shape similar to those of ring-bands of the ring-band structure.

In the example shown in FIG. 20C, the area A used for expanding a depth is formed into "an elliptical ring shape" similar to that of "the ring-band structure of the diffraction lens surface". The area A is integrated within the zeroth ring-band of the ring-band structure such that the area A has the height h' from the bottom surface of the zeroth ring-band and the outer circumference of the area A coincides with the outer circumference (edge) of the zeroth ring-band.

In the examples shown in FIGS. 20B and 20C, "all ring-bands including the ring-band corresponding to the area A" are formed such that every ring-band is uniformly "kept higher" than an adjacent inner ring-band.

Figure 21A:
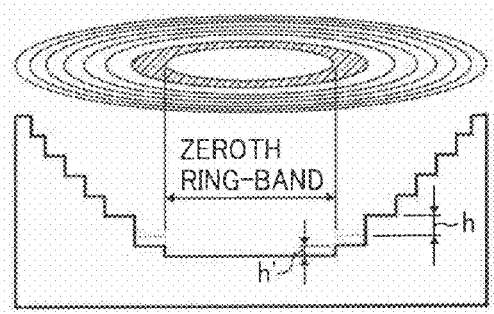
Figure 21B:
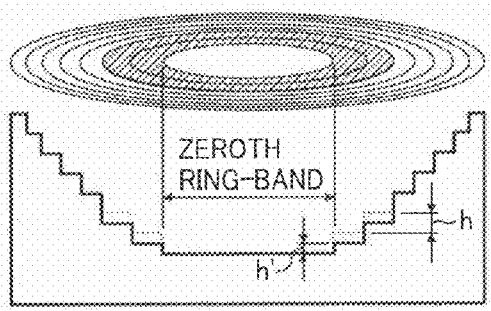

FIG. 21A depicts an example in which the area A (a portion indicated by hatched lines) used for expanding a depth is formed into an elliptical ring shape similar to the elliptical ring shape of each ring-band of a ring-band structure of a diffraction lens surface. The area A is formed into the shape same as that of the first ring-band of the ring-band structure. FIG. 21B depicts an example in which the area A (a portion indicated by hatched lines) used for expanding a depth is formed into an elliptical ring shape similar to that of a ring-band structure of a diffraction lens surface. The area A is formed into the shape same as those of the first and the second ring-bands in the ring-band structure. In this manner, it is preferable to form the area A into the shape "same as that of the n-th (n≧0) ring-band of the ring-band structure".

Figure 21C:
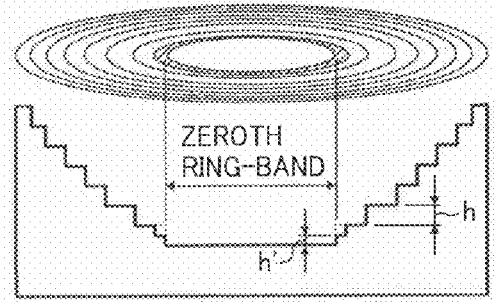

FIG. 21C depicts an example in which the area A (a portion indicated by hatched lines) used for expanding a depth is formed into an elliptical ring shape such that the inner circumference of the elliptical ring shape coincides with the inner circumference of "an elliptical ring shape of the first ring-band of a ring-band structure on a diffraction lens surface", while the outer circumference of the area A is within the outer circumference of the first ring-band.

Figure 21D:
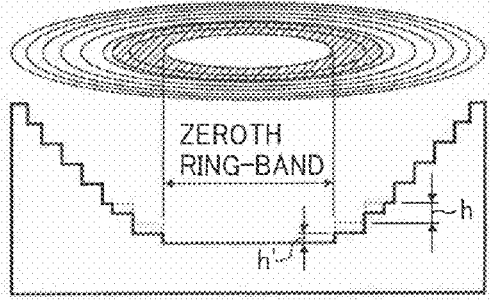

FIG. 21D depicts an example in which the area A (a portion indicated by hatched lines) used for expanding a depth is formed into an elliptical ring shape such that the inner circumference of the elliptical ring shape coincides with the inner circumference of "an elliptical ring shape of the first ring-band of a ring-band structure on a diffraction lens surface", while the outer circumference of the area A is "within the second ring-band of the ring-band structure".

Figure 22A:
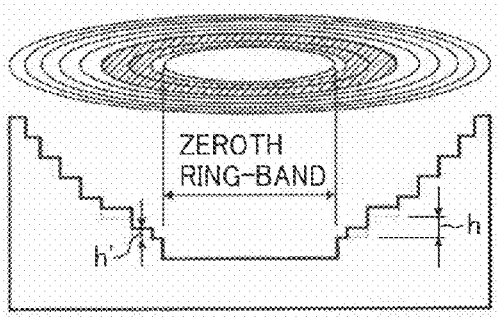

FIG. 22A depicts an example in which the area A (a portion indicated by hatched lines) used for expanding a depth is formed into an elliptical ring shape such that the outer circumference of the elliptical ring shape coincides with "the outer circumference of the second ring-band of a diffraction lens surface having a ring-band structure of an elliptical ring shape", while the inner circumference of the area A is "within the first ring-band of the diffraction lens surface".

Figure 22B:
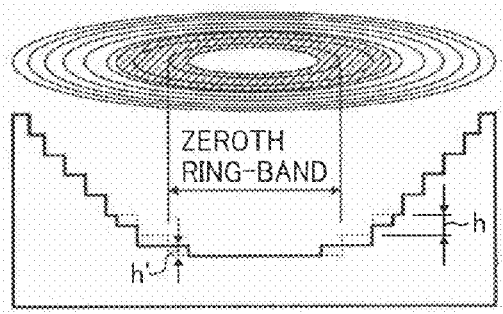

FIG. 22B depicts an example in which the area A (a portion indicated by hatched lines) used for expanding a depth is formed into an elliptical ring shape such that the inner circumference of the elliptical ring shape is "within the zeroth ring-band of a diffraction lens surface having a ring-band structure of an elliptical ring shape", while the outer circumference of the elliptical ring shape of the area A is "within the second ring-band of the diffraction lens surface".

Figure 22C:
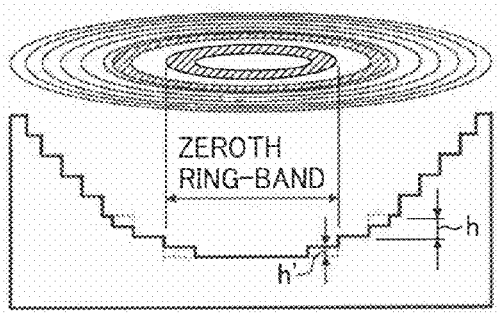

FIG. 22C depicts an example in which the area A (a portion indicated by hatched lines) used for expanding a depth is formed into "a concentric elliptical ring shape formed of a plurality of ring-bands". An inner elliptical ring shape has the outer circumference coinciding with the outer circumference of the zeroth ring-band of a diffraction lens surface (which has "a ring-band structure formed of elliptical ring-bands"), and the inner circumference being within the zeroth ring-band of the diffraction lens surface. "An outer elliptical ring shape" of the area A has the inner circumference coinciding with the inner circumference of the second ring-band of the diffraction lens surface and the outer circumference being within the second ring-band of the diffraction lens surface. As described above, the area A can be formed into "the elliptical ring shape formed of a plurality of elliptical ring-bands".

In this manner, it is preferable to form the area A within the n-th ring-band (n≧0) of a ring-band structure on a diffraction lens surface such that at least one of the inner circumference and the outer circumference coincides with "the contour of the ring-band structure on the diffraction lens surface". It is also applicable to form the area A such that the area A "overlaps with the n-th ring-band (n≧0) and adjacent one or more ring-bands of a ring-band structure (see FIGS. 21D, 22A, and 22B)".

Figure 23A:
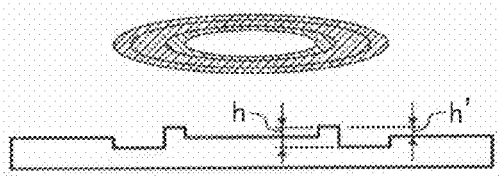
FIGS. 23A and 23B are schematic diagrams for explaining the shape of the area A in the example shown in FIG. 22B.
Figure 23B:
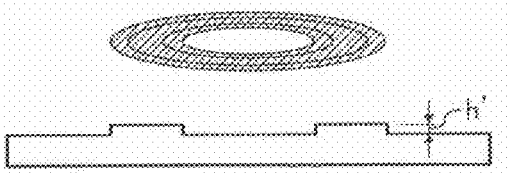

FIG. 23A depicts the area A of FIG. 22B. FIG. 23B depicts the shape that is optically the same as that of the area A of FIG. 23A. The shape shown in FIG. 23B is optically the same as that shown in FIG. 23A because the height difference h between adjacent ring-bands is set to give "a phase difference of 2π with respect to an operation wavelength".

The most preferable relation between the ring-band structure and the area A used for expanding a depth is attained when the area A overlaps with "at least a portion" of the zeroth ring-band of the ring-band structure of the diffraction lens surface (e.g., the structures of FIGS. 20B, 20C, and 23B). With this configuration, it is possible to suppress high-order side lobe and effectively expand the depth allowance.

In the examples described with reference to FIGS. 20A to 20C, 21A to 21D, and 22A to 22C, the diffraction lens surface with the ring-band structure is formed into "the multi-stepped shape". However, the ring-band structure can be formed into "the diffraction lens surface that has power" as described with reference to FIGS. 15A to 15C.

Figure 24A:
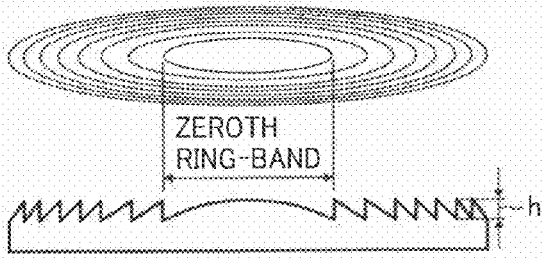
FIGS. 24A to 24C are schematic diagrams of examples of the surface of a diffraction lens with the area A.

FIG. 24A depicts an example of a ring-band structure on "the diffraction lens surface that has power". Each ring-band of the ring-band structure has an elliptical ring shape with a sloped portion formed into a conic surface. The zeroth ring-band is formed into a convex lens surface.

Figure 24B:
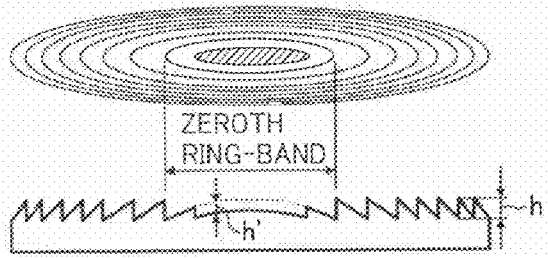
Figure 24C:
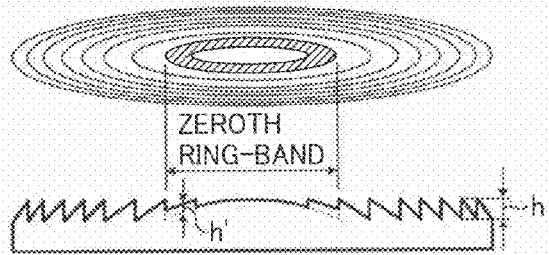

FIG. 24B depicts an example in which the area A (a portion indicated by hatched lines) having the elliptical shape is formed with respect to the ring-band structure of FIG. 24A so that a concave portion with the height h' is formed within the zeroth ring-band of the ring-band structure. FIG. 24C depicts an example in which the area A (a portion indicated by hatched lines) having the elliptical shape is formed with respect to the ring-band structure of FIG. 24A so that the outer circumference of the area A coincides with the outer circumference of the zeroth ring-band within the zeroth ring-band of the ring-band structure.

While it is explained in the above examples that the ring-band of the ring-band structure of the diffraction lens surface is formed into the elliptical ring shape (the zeroth ring-band has the elliptical shape), the shape of the ring-band structure is not limited to these examples. It is possible to form a diffraction lens surface with a concentric ring-band structure formed of circular ring-bands, or a diffraction lens surface having a linear ring-band structure. Further, the diffraction lens surface can be integrated with the ring-shape area used for expanding a depth in the above-described manner.

As described above, the height difference h between adjacent ring-bands of the ring-band structure is set so that a phase difference is determined to be about 2π radian with respect to an operation wavelength. If the height h' of the area A is set to be different from the height difference h between adjacent ring-bands, the depth expanding function can become effective. Therefore, it is sufficient if at least the condition that the height h' is different from the height h is satisfied. However, it is most preferable to set the height h' to be half of the height h so as to "maximize the depth expanding effect" (claim 8).

The optical scanning device according to the embodiment employs a laser light source such as a semiconductor laser (laser diode (LD)) or a surface-emitting laser (vertical-cavity surface-emitting laser). Besides, the optical scanning device also includes "an aperture" that performs beam shaping for regulating the width of a beam to be incident on an imaging lens, so that "fluctuation in divergence angle" that is a typical phenomena due to manufacturing of the laser light source or fluctuation in beam spot size on a scanning surface over time can be suppressed. Due to the use of the aperture, fluctuation in beam spot size of a focal position on a scanning surface can be effectively suppressed. On the other hand, the aperture causes light diffraction, turning the beam profile on the scanning surface to "a profile accompanying a side lobe".

As described above, when the area A for expanding a depth is used, light diffraction occurs by the area A, resulting in the beam profile to be "formed under the complex effect of light diffraction by the aperture and light diffraction by the area A".

Thus, because the beam profile is formed under the effect both of light diffraction by the aperture and light diffraction by the area A, the beam profile largely changes due to a relative positional relation between the aperture and the area A, resulting in changing the depth allowance.

To effectively reduce or suppress fluctuation in positional relation between the aperture and the area A, it is preferable that a diffraction lens surface with the area A be brought extremely closer to the aperture or be integrated with the aperture (claim 11). In this case, it is most preferable to arrange a mechanism capable of adjusting the relative position of the aperture and the diffraction lens with the area A "within a plane substantially perpendicular to a light beam".

If a laser light source is a multibeam light source, incident angles at the aperture and the diffraction lens surface vary with respect to each multibeam. Therefore, if the aperture is arranged at a position distant from the "diffraction lens surface with the area A", the positional relation between the aperture and the diffraction lens surface vary with respect to each multibeam. If the diffraction lens surface with the area A is brought extremely closer to the aperture or integrated with the aperture, the above-mentioned situation can be prevented. Therefore, if a multibeam light sources is employed as a laser light source, it is preferable that the diffraction lens surface with the area A be brought extremely closer to the aperture or be integrated with the aperture.

Examples of the multibeam light source include an LD array in which edge emitting laser diodes are arrayed on a plane or a surface-emitting laser array in which surface-emitting laser diodes are two-dimensionally arrayed.

It was found from an experiment that, when a transmittance of a light shielding portion of the aperture is large, even a light beam slightly transmitted the light shielding portion of the aperture affects "a beam spot size near a focal position". Concretely, if an aperture having "a light shielding portion with a transmittance of about 0.3%" is used, a beam spot size increases by 3 micrometers to 5 micrometers. Such a problem can be resolved by setting "the light shielding portion to have a transmittance of 0.1% or less" (claim 12).

A result of a simulation carried out by using an optical system related to a configuration of the optical scanning device as described with reference to FIG. 1 is described below. As mentioned earlier, the scanning lens 8 is made of resin, and input of a light beam from the laser light source 1 to the polygon mirror 7 and output of a deflected light from the polygon mirror 7 are carried out through a parallel plate glass that covers a window of an insulating casing (not shown in FIG. 1) housing the polygon mirror 7. In FIG. 1, a vertical direction of the figure corresponds to the main-scanning direction and a chief ray of a light beam incident from the laser light source 1 onto the polygon mirror 7 is inclined at 34 degrees with respect to the main-scanning direction. That is, when a normal line of the deflecting reflection surface is inclined at 34 degrees with respect to the optical axis of the scanning lens in a direction of a rotation axis of the polygon mirror 7, a deflected light beam becomes parallel to the optical axis.

The scanning lens 8 is formed to have an incident surface (the first surface) and an output surface (the second surface) obtained by the following Equation (1) and Equation (2), where $Rm0$ is paraxial curvature radius in the main-scanning direction (curvature is $Cm0=1/Rm0$), $Rs0$ is paraxial curvature radius in the sub-scanning direction (curvature is $Cs0$), $a00, a01, a02, \ldots, b01, b02, b03, \ldots$ are parameters, X is optical axis direction, Y is main-scanning direction, and Z is sub-scanning direction.

$$X(Y, Z) = Cm0 \cdot Y^2 / [1 + \sqrt{1(1 + a00) \cdot Cm0^2 \cdot Y^2}] + a01 \cdot Y + a02 \cdot Y^2 + a03 \cdot Y^3 + a04 \cdot Y^4 + \ldots + Cs(Y) \cdot Z^2 / [1 + \sqrt{1Cs(Y)^2 \cdot Z^2}] \quad (1)$$

where $$Cs(Y) = Cs0 + b01 \cdot Y + b02 \cdot Y^2 + b03 \cdot Y^3 + Cm0 = 1/Rm0, \quad (2)$$
$$Cs0 = 1/Rs0$$

The coupling lens 3 is formed to have an incident surface that is a plane surface and an output surface that is a rotationally symmetric aspheric surface, which is obtained by the following Equation 3.

$$X(H) = C \cdot H^2 / \left[1 + \sqrt{\left\{\frac{1(1+K) \cdot}{C^2 \cdot H^2}\right\}}\right] + A2 \cdot H^2 + A3 \cdot H^3 + \quad (3)$$

where, $C = 1/R$.

The cylindrical lens 5 is formed to have an incident surface that is a cylindrical surface having a curvature only in the sub-scanning direction and an output surface that is a plane surface.

Data about the incident surface (the first surface) and the output surface (the second surface) of the scanning lens 8 and the incident surface (the cylindrical surface) of the cylindrical lens 5 is provided in the following Table 1.

TABLE 1

|  | First surface of scanning lens | Second surface of scanning lens | Cylindrical lens (incident surface) |
|---|---|---|---|
| Rm0 | 200 | −196.881 | 0 |
| Rs0 | 130 | −24.955 | 24.51 |
| a00 | 0.0000E+00 | 0.0000E+00 | — |
| a04 | −1.2707E−06 | −5.5974E−07 | — |
| a06 | −1.0378E−10 | −1.3122E−10 | — |
| a08 | 6.2178E−13 | 1.9439E−14 | — |
| a10 | −4.2675E−16 | 8.3171E−17 | — |
| a12 | 1.2571E−19 | −5.0072E−20 | — |
| a14 | −1.3454E−23 | 8.6251E−24 | — |
| b01 | — | −1.4016E−05 | — |
| b02 | — | 7.2676E−06 | — |
| b03 | — | −3.8531E−09 | — |
| b04 | — | −3.2680E−09 | — |
| b05 | — | 1.9064E−12 | — |
| b06 | — | 1.0300E−12 | — |
| b07 | — | −4.2941E−16 | — |
| b08 | — | −1.4822E−16 | — |

In Table 1, description of "−1.4822E−16" means "$-1.4822 \times 10^{-16}$". The same is applied to other descriptions above and below.

Data about an interval (distance) between optical elements located on a path from a light source to a focusing surface (a scanning surface) is provided in the following Table 2.

TABLE 2

|  |  | Distant to next surface [mm] |
|---|---|---|
| Light source |  | 12.455 |
| Coupling lens | Incident surface | 2.98 |
|  | Output surface | 9.495 |

TABLE 2-continued

| | | Distant to next surface [mm] |
|---|---|---|
| Aperture | | 12.4 |
| Cylindrical lens | Incident surface | 3 |
| | Output surface | 47.433 |
| Polygon mirror (inclination angle of 34 degrees) | | 42.191 |
| Scanning lens | Incident surface | 18 |
| | Output surface | 200.898 |
| Focusing surface | | — |

In Table 2, "light source" corresponds to the laser light source 1, and "focusing surface" corresponds to the scanning surface 11. It can be found from Table 2 that the aperture 12 is brought closer to the incident surface of the cylindrical lens 5 although the aperture 12 is depicted between the coupling lens 3 and the cylindrical lens 5 in the example of FIG. 1.

Data about the output surface of the coupling lens 3 is provided in the following Table 3.

TABLE 3

| Coupling lens (Output surface) | |
|---|---|
| R | −7.4212 |
| K | −1.534699 |
| A4 | −3.0167E−04 |
| A6 | 5.6311E−06 |
| A8 | −1.8261E−06 |
| A10 | 2.0459E−07 |

It is assumed that the wavelength of the light source is 655 nanometers.

The coupling lens 3 is a glass lens with a refractive index of 1.515141. Each of the cylindrical lens 5 and the scanning lens 8 is a resin lens with a refractive index of 1.527257. As mentioned above, the aperture 12 is brought closer to the incident surface of the cylindrical lens 5. The scanning lens 8 has a lateral magnification rate of about minus 3.7 times as large in the sub-scanning direction.

The diffraction lens surface with the ring-band structure and the area A used for expanding a depth are formed on the output surface of the cylindrical lens 5. The ring-band structure of the diffraction surface is formed into the elliptical ring shape in which the zeroth ring-band has the elliptic shape with a long-axis diameter of 1.480 millimeters and a short-axis diameter of 0.420 millimeter.

A simulation of the ring-band structure (the diffraction lens surface) without the area A was carried out. A variable range of a temperature inside the optical scanning device is set from 10° C. to 45° C.

The following fluctuation in curvature of a focusing surface in the main-scanning direction and in the sub-scanning direction due to temperature fluctuation was obtained.

The main-scanning direction:
minus 0.7 millimeter to 0.9 millimeter (without the diffraction lens surface)
minus 0.3 millimeter to 0.2 millimeter (with the diffraction lens surface)

The sub-scanning direction:
minus 3.4 millimeters to 4.8 millimeters (without the diffraction lens surface)
minus 0.1 millimeter to 0.2 millimeter (with the diffraction lens surface)

It can be found from the above simulation result that the "fluctuation in curvature of a focusing surface" is suppressed both in the main-scanning direction and in the sub-scanning direction by using the diffraction lens surface having the ring-band structure.

A simulation of effect of the area A used for expanding a depth was also carried out. "A conventional example in which a rectangular aperture is used" is referred to as a comparison example, while an example in which the area A is used is referred to as "a present example" as the example of the present invention. The following conditions were set for the simulation.

Comparison example (conventional example): a rectangular aperture of 3.30 millimeters×2.76 millimeters Present example: an elliptical aperture of 3.56 millimeters×3.08 millimeters, with a diffraction lens having a ring-band structure with an area A The size of the aperture in the comparison example is represented by width of "the main-scanning width×the sub-scanning width". The size of the elliptical aperture in the present example is represented by width of "the long-axis diameter×the short-axis diameter".

Figure 25:
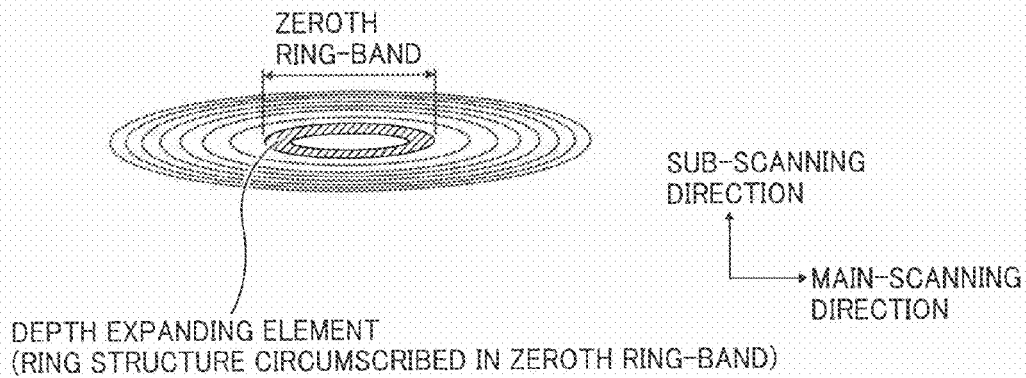
FIG. 25 is a schematic diagram of an example of the surface of a diffraction lens with the area A used for a simulation according to the embodiment.

FIG. 25 depicts "shapes of a diffraction lens surface and a ring-shape area" used for the above simulation.

The ring-band structure has the zeroth ring-band having an elliptical shape with a long-axis diameter of 1.480 millimeters and a short-axis diameter of 0.420 millimeter. Ring-bands having the elliptical ring shapes are concentrically formed around the zeroth ring-band. This configuration is made so that fluctuation in curvature of a focusing surface due to temperature fluctuation can be corrected.

The area A (a portion indicated by hatched lines) used for expanding a depth is formed into "the elliptical ring shape" and brought into contact with an inner circumference of the zeroth ring-band of the ring-band structure as shown in FIG. 25. The elliptical ring shape has an inner diameter of 0.700 millimeter (the main-scanning direction)×0.200 millimeter (the sub-scanning direction), and an outer diameter of 1.480 millimeter (the main-scanning direction)×0.420 millimeter (the sub-scanning direction).

Figure 26A:
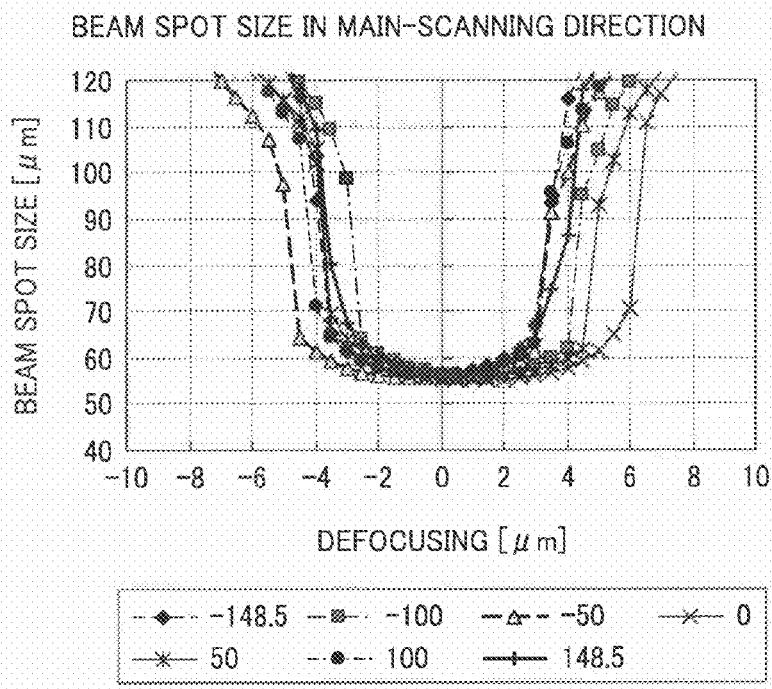
FIGS. 26A and 26B are graphs of a depth allowance when a depth is not expanded.
Figure 26B:
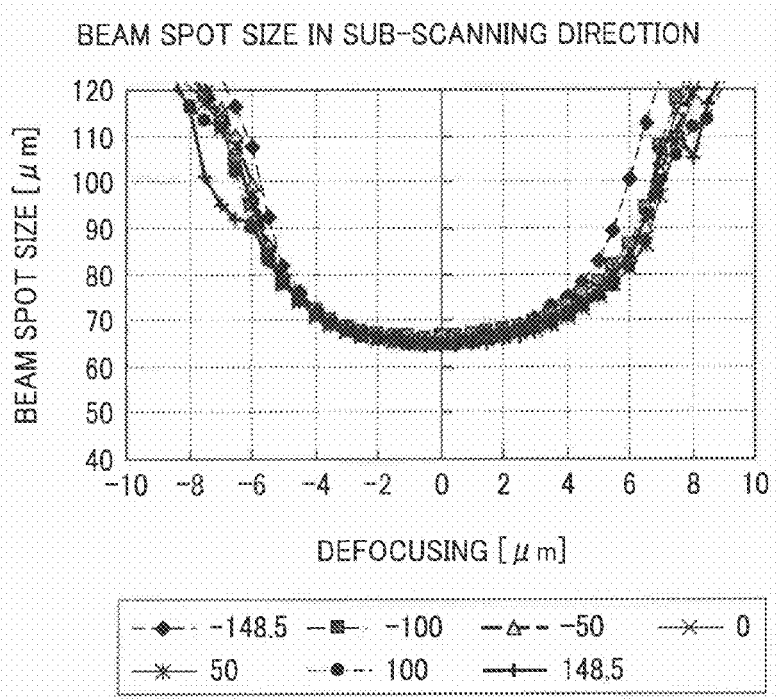

FIGS. 26A, 26B, 27A, and 27B are graphs of beam spot size versus defocusing, where the horizontal axis represents defocusing and the vertical axis represents beam spot size. FIGS. 26A and 26B depict simulation results from the conventional example, while FIGS. 27A and 27B depict simulation results from the example in which the area A is used for expanding a depth. It can be found from the FIGS. 26A, 26B, 27A, and 27B that the depth allowance is expanded both in the main-scanning direction and in the sub-scanning direction by using the area A. The degree of expansion in the sub-scanning direction is extremely large partly because the shape of the aperture is changed from a rectangle, which is commonly used in the conventional technologies, to an ellipse.

In this manner, as apparent from the situation, the fluctuation in curvature of a focusing surface due to temperature fluctuation can be suppressed and the depth allowance can be expanded by arranging the diffraction lens surface having a ring-band structure with the area A used for expanding a depth.

According to one aspect of the present invention, the optical scanning device can be configured such that a beam spot size for optical scanning can be maintained to be a small size, the depth allowance can be expanded, and fluctuation in focal position on a focusing surface due to environmental fluctuation can be effectively suppressed. Therefore, the optical scanning device can perform optical scanning stably without being affected by environmental fluctuation. As a result, an image forming apparatus having that optical scanning device can stably perform image forming without being affected by environmental fluctuation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a laser light source that emits a light beam;
    an optical unit that guides the light beam to a deflecting unit from the laser light source, wherein the deflecting unit has a deflecting reflection surface and deflects the light beam focused near the deflecting reflection surface by a cylindrical lens; and
    a scanning lens that focuses the light beam deflected by the deflecting unit into a scanning beam on a scanning surface, wherein
    at least one optical element of the optical unit has a diffraction lens surface having a ring-band structure with a height h between adjacent ring-bands,
    the diffraction lens surface has an area A having a shape similar to that of the ring-band structure with a height h', where h' is different from h.

2. The optical scanning device according to claim 1, wherein a shape of the ring-band structure is any one of concentric circles, concentric ellipses, and linear array.

3. The optical scanning device according to claim 1, wherein the area A is arranged on inner side of a fifth ring-band of the ring-band structure.

4. The optical scanning device according to claim 1, wherein the ring-band structure is formed into a multi-stepped shape in which a height of each ring-band is monotonically increasing or decreasing from inner side towards outer side.

5. The optical scanning device according to claim 1, wherein the area A is formed in either one of an elliptical shape and an elliptical ring shape arranged on inner side of zeroth ring-band of the ring-band structure such that the elliptical shape is arranged at a center of the ring-band structure or the elliptical ring shape is inscribed in the zeroth ring-band.

6. The optical scanning device according to claim 1, wherein the area A is formed into a shape same as at least one of n-th ring-bands of the ring-band structure, where n is an integer equal to or larger than zero.

7. The optical scanning device according to claim 1, wherein the area A is arranged within n-th ring-band of the ring-band structure, where n is an integer equal to or larger than zero, such that at least one of inner circumference and outer circumference of the area A coincides with a contour of the ring-band structure or the area A overlaps with both the n-th ring-band and at least one of adjacent ring-bands.

8. The optical scanning device according to claim 1, wherein h' is set to about a half of h.

9. The optical scanning device according to claim 1, wherein the scanning lens is a magnifying optical system in which a lateral magnification in the sub-scanning direction is set to be equal to or larger than −2 optical power and equal to or smaller than −5 optical power.

10. The optical scanning device according to claim 1, wherein the scanning lens is formed with a single lens.

11. The optical scanning device according to claim 1, further comprising:
    an aperture that shapes the light beam, wherein
    the aperture is arranged near a lens that has the diffraction lens surface having the ring-band structure and the area A, or integrated with the lens.

12. The optical scanning device according to claim 1, further comprising:
    an aperture that shapes the light beam, wherein
    the aperture includes a shielding portion having a transmittance equal to or less than 0.1%.

13. An image forming apparatus that forms an electrostatic latent image on a photosensitive element, the image forming apparatus comprising:
    an optical scanning device that scans a surface of the photosensitive element with a light beam, the optical scanning device including:
        a laser light source that emits the light beam,
        an optical unit that guides the light beam to a deflecting unit from the laser light source, wherein the deflecting unit has a deflecting reflection surface and deflects the light beam focused near the deflecting reflection surface by a cylindrical lends; and
        a scanning lens that focuses the light beam deflected by the deflecting unit into a scanning beam on a scanning surface, wherein
    at least one optical element of the optical unit has a diffraction lens surface having a ring-band structure with a height h between adjacent ring-bands,
    the diffraction lens surface has an area A having a shape similar to that of the ring-band structure with a height h', where h' is different from h.

14. The image forming apparatus according to claim 13, wherein the photosensitive element includes a plurality of photosensitive elements on which electrostatic latent images of different colors are formed and developed into toner images with toners of corresponding colors, respectively, and the toner images are superimposed on a recording medium to form a full-color image.

15. The optical scanning device according to claim 1, wherein:
    the ring-band structure has a function of correcting a fluctuation in focal position of the scanning beam on the scanning surface, and
    the area A has a function of expanding a focal depth of a light spot on the scanning surface.

16. The optical scanning device according to claim 1, wherein the optical unit has:
    a cylindrical lens; and
    a coupling lens that guides the light beam to the cylindrical lens,
    wherein the cylindrical lens focuses the light beam into a linear image, and at least one of the coupling lens and the cylindrical lens has a diffraction lens surface having a ring- band structure with a height h between adjacent ring bands.

* * * * *